(12) United States Patent
Zerphy et al.

(10) Patent No.: US 7,986,282 B2
(45) Date of Patent: Jul. 26, 2011

(54) DYNAMIC MESSAGE SIGN DISPLAY PANEL ERROR DETECTION, CORRECTION, AND NOTIFICATION

(76) Inventors: Byron L. Zerphy, Macungie, PA (US); Eric J. Zerphy, Allentown, PA (US)

( * ) Notice: Subject to any disclaimer, the term of this patent is extended or adjusted under 35 U.S.C. 154(b) by 928 days.

(21) Appl. No.: 11/812,167

(22) Filed: Jun. 15, 2007

(65) Prior Publication Data

US 2007/0241988 A1    Oct. 18, 2007

Related U.S. Application Data

(63) Continuation-in-part of application No. 10/748,171, filed on Dec. 31, 2003, now Pat. No. 7,248,229.

(51) Int. Cl.
G09G 5/00    (2006.01)
(52) U.S. Cl. .......................................... 345/1.3
(58) Field of Classification Search ............ 345/1.1–3.4, 345/55, 87, 76, 82, 204; 708/530–531; 714/48
See application file for complete search history.

(56) References Cited

U.S. PATENT DOCUMENTS

| | | |
|---|---|---|
| 4,642,794 A | 2/1987 | Lavelle et al. |
| 5,767,818 A | 6/1998 | Nishida |
| 5,796,376 A | 8/1998 | Banks |
| 5,914,698 A | 6/1999 | Nicholson et al. |
| 5,949,581 A | 9/1999 | Kurtenbach et al. |
| 5,986,622 A | 11/1999 | Ong |
| 6,002,411 A | 12/1999 | Dye |
| 6,088,008 A | 7/2000 | Reeder |
| 6,097,351 A | 8/2000 | Nishida |
| 6,104,414 A | 8/2000 | Odryna et al. |
| 6,150,996 A | 11/2000 | Nicholson et al. |
| 6,169,632 B1 | 1/2001 | Kurtenbach et al. |
| 6,175,342 B1 | 1/2001 | Nicholson et al. |
| 6,252,564 B1 | 6/2001 | Albert et al. |
| 6,314,669 B1 | 11/2001 | Tucker |
| 6,379,209 B1 | 4/2002 | Tucker |
| 6,414,650 B1 | 7/2002 | Nicholson et al. |

(Continued)

OTHER PUBLICATIONS

Solar Technology, Inc., "Silent Messenger SOL-R-SIGN™ Solar Powered Portable Changeable Message Sign Full Matrix Display—Version 9.3e, Operation & Maintenance Manual (P/N 550-024-100)," 84 pages, Feb. 2, 2000.

(Continued)

Primary Examiner — Stephen G Sherman
(74) Attorney, Agent, or Firm — Finnegan, Henderson, Farabow, Garrett & Dunner, LLP

(57) ABSTRACT

In accordance with the invention, the present disclosure is related to a sign display panel for displaying a sign display panel message. The sign display panel includes at least one set of display units. Each display unit of the at least one set of display units includes a plurality of display units. In addition, each of the plurality of display units includes a display unit central processing unit (CPU) configured to execute software instructions associated with the display of the sign display panel message, a display unit memory configured to store the software instructions for execution by the display unit CPU, and a plurality of display elements configured to respond to signals sent from the display unit CPU. The sign display panel also includes at least one interconnect (IC) unit. The at least one IC unit is coupled to a first display unit and a second display unit included in the at least one set of display units. In addition, the sign display panel includes a controller connected to the at least one IC unit.

60 Claims, 18 Drawing Sheets

U.S. PATENT DOCUMENTS

| | | |
|---|---|---|
| 6,492,982 B1 | 12/2002 | Matsuzaki et al. |
| 6,956,541 B2 | 10/2005 | McClintock |
| 6,999,045 B2 | 2/2006 | Cok |
| 7,053,862 B2 | 5/2006 | Zerphy et al. |
| 7,098,869 B2 | 8/2006 | Vaitekunas et al. |
| 7,193,583 B2 | 3/2007 | Zerphy et al. |
| 7,248,229 B2 * | 7/2007 | Zerphy et al. ............. 345/1.3 |
| 2002/0113808 A1 * | 8/2002 | Weindorf et al. ............ 345/699 |
| 2002/0118144 A1 | 8/2002 | Edmonds |
| 2003/0206228 A1 | 11/2003 | Trevers et al. |
| 2004/0123501 A1 | 7/2004 | Safavi et al. |
| 2005/0146485 A1 | 7/2005 | Zerphy et al. |
| 2005/0146530 A1 | 7/2005 | Zerphy et al. |
| 2005/0149632 A1 | 7/2005 | Minami et al. |
| 2005/0156810 A1 | 7/2005 | Zerphy et al. |

OTHER PUBLICATIONS

Solar Technology, Inc., "Specifications for Solar Powered Portable Changeable Message Sign," 6 pages, Mar. 10, 2001.

Solar Technology, Inc., "SolarTech Silent Messenger" (publication brochure No. 500-024-010/99), Oct. 1999.

* cited by examiner

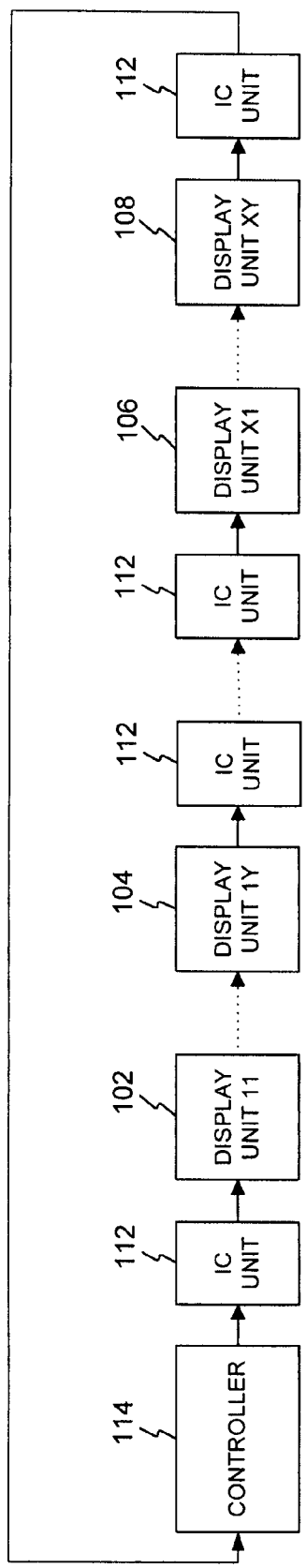

DYNAMIC MESSAGE SIGN DISPLAY PANEL ERROR DETECTION, CORRECTION, AND NOTIFICATION

BENEFIT OF PRIORITY

This application is a Continuation-in-Part and claims benefit of priority of U.S. patent application Ser. No. 10/748,171, filed Dec. 31, 2003, now U.S. Pat. No. 7,248,229, to Zerphy et al. and entitled "DYNAMIC MESSAGE SIGN DISPLAY PANEL COMMUNICATION ERROR DETECTION AND CORRECTION," which is herein incorporated by reference in its entirety.

FIELD OF THE INVENTION

The present invention relates to dynamic message signs. More particularly, the present invention relates to systems and methods for the detection, correction, and notification of errors in dynamic message sign communications.

BACKGROUND OF THE INVENTION

A dynamic message sign is a sign having a message that can be dynamically changed. Dynamic message signs may be used to publicly display information and/or graphics. For example, dynamic message signs are used on roadways to alert motorists of traffic information, and as commercial signs, e.g., to advertise business or product information. Dynamic message signs may be connected to a controller for controlling messages displayed by the sign. Typically, a controller is a computing device having an interface for communicating with the sign.

Dynamic message signs may also include multiple individual display units, that each produce part of the overall display. In a dynamic message sign having multiple display units, the controller may communicate with each display unit to send information to refresh the display units.

During operation, dynamic message signs may fail to communicate properly with the controller. This failure may be caused by a disruption in the communication system or, in the case of a dynamic message sign having multiple display units, by a damaged or malfunctioning display unit. Alternatively, the data sent to the dynamic message sign panel by the controller may become corrupted. Conventional dynamic message signs are not configured to detect or correct communication and/or data errors.

SUMMARY OF THE INVENTION

In one aspect, the present disclosure is related to a sign display panel for displaying a sign display panel message. The sign display panel includes at least one set of display units. Each of the at least one set of display units includes a plurality of display units. In addition, each of the plurality of display units includes a display unit central processing unit (CPU) configured to execute software instructions associated with the display of the sign display panel message, a display unit memory configured to store the software instructions for execution by the display unit CPU, and a plurality of display elements configured to respond to signals sent from the display unit CPU. The sign display panel also includes at least one interconnect (IC) unit. The at least one IC unit is coupled to a first display unit and a second display unit included in the at least one set of display units. In addition, the sign display panel includes a controller connected to the at least one IC unit.

In another aspect, the present disclosure is related to a method for sign display panel communication for use in a sign display panel. The method connects a controller, an interconnect (IC) unit, and at least one set of display units in a closed serial loop. Each display unit of the at least one set of display units includes a plurality of display elements. The method also determines a sign display panel configuration. The sign display panel includes the at least one set of display units. In addition, the method determines a sign display panel message configuration based on the sign display panel configuration.

In another aspect, the present disclosure is related to a sign display panel display for displaying a sign display panel message. The sign display panel includes at least one set of display units, wherein each of the at least one set of display units includes a plurality of display units. Each of the plurality of display units includes a display unit central processing unit (CPU) configured to execute software instructions associated with the display of the sign display panel message, a display unit memory configured to store the software instructions for execution by the display unit CPU, and a plurality of display elements configured to respond to signals sent from the display unit CPU. The sign display panel also includes at least one interconnect (IC) unit connected to a first display unit and a second display unit included in the at least one set of display units. In addition, the sign display panel includes at least one environmental sensor. The at least one environmental sensor is located near the at least one set of display units and is configured to detect an environmental condition. The sign display panel also includes a controller connected to the at least one IC unit In another aspect, the present disclosure is related to a method for sign display panel communication. The method includes connecting a controller, an interconnect (IC) unit, and at least one set of display units in a closed serial loop. Each display unit of the at least one set of display units includes a plurality of display elements. The method also includes determining a sign display panel configuration. The sign display panel includes the at least one set of display units. In addition, the method includes determining a sign display panel message configuration based on the sign display panel configuration and at least one display parameter.

In another aspect, the present disclosure is related to a sign display panel. The sign display panel includes a controller connected to at least one interconnect (IC) unit. The controller includes a controller central processing unit (CPU) and a controller memory for storing software instructions executed by the controller CPU to direct the controller to send a message to the at least one IC unit. The sign display panel also includes at least one set of display units connected to the at least one IC unit. Each display unit of the at least one set of display units includes a plurality of display elements, a display unit central processing unit (CPU), and a display unit memory for storing display unit software configured for execution by the display unit CPU that directs the display unit CPU to detect an error in the message and send an error message to the controller.

In another aspect, the present disclosure is related to a method of sign display panel communication. The method includes connecting at least one set of display units, at least one interconnect (IC) unit, and a controller in a closed serial loop. Each display unit of the at least one set of display units includes a plurality of display elements. The method also includes sending a message from the controller to the at least one IC unit and sending the message from the at least one IC unit to the at least one display unit of the at least one set of display units. The method also includes receiving the message at the at least one display unit and detecting an error in the message. In addition, the method includes sending an error indication from the at least one display unit to the controller based on the detected error in the message.

In another aspect, the present disclosure is related to a method of sign display panel communication. The method includes connecting at least one set of display units, an interconnect (IC) unit, and a controller in a closed serial loop. Each display unit of the at least one set of display units includes a plurality of display elements. The method also includes setting a timer to a time limit. In addition, the method includes receiving communication integrity messages from the controller through the IC unit and resetting the timer to the time limit upon receipt of each of the communication integrity messages. The method also includes sending an error message to the controller when the timer meets or exceeds the time limit.

In another aspect, the present disclosure is related to a method of sign display panel communication. The method includes connecting at least one set of display units, an interconnect (IC) unit, and a controller in a closed serial loop. Each display unit of the at least one set of display units includes a plurality of display elements. The method also includes sending communication integrity messages to the at least one set of display units through the IC unit. In addition, the message includes receiving a response message from at least one display unit of the set of display units in response to each of the communication integrity messages and determining if the response message indicates a communication error.

In another aspect, the present disclosure is related to a sign display panel controller that is connected to an interconnect (IC) unit and at least one set of display units. The sign display panel controller includes a controller central processing unit (CPU). The sign display panel controller also includes an I/O interface for sending communication integrity message to at least one of the set of display units through the IC unit. In addition, the sign display panel controller includes a memory including controller software configured for execution by the controller CPU. The controller software includes software instructions for determining an error in a communication network based on a response message received in response to each of the series of communication integrity messages. The response message includes an integer value and each display unit of the at least one set of display units that receives the response message performs a mathematical process using the integer value.

In another aspect, the present disclosure is related to a set of sign display panel components connected in a serial communication network. Each sign display panel component receives messages from a first sign display panel component, and sends messages to a second sign display panel component. The set of sign display panel components includes a controller including a controller central processing unit (CPU) and a memory. The memory includes controller software configured for execution by the controller CPU. The controller software includes software instructions for sending communication integrity message to the serial communication network. The set of sign display panel components also includes at least one interconnect (IC) unit connected to the controller and configured to receive the communication integrity messages and at least one set of display units. Each display unit of the at least one set of display units includes a display timer set to a time limit, a display unit central processing unit (CPU), and a display memory for storing display unit software configured for execution by the display unit CPU. The display unit software also includes display unit software instructions for resetting the display timer upon receipt of each communication integrity message from the IC unit and, if the timer meets or exceeds the timer limit, sending an error message to the controller. The error message includes an integer value and each display unit that receives the error message performs a mathematical process on the integer value.

Additional embodiments of the invention will be set forth in part in the description which follows, and in part will be obvious from the description, or may be learned by practice of the invention. Certain embodiments of the invention will be realized and attained by means of the elements and combinations particularly pointed out in the appended claims. Further, it is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 2a shows a block diagram of an exemplary communication network for a sign display panel consistent with certain disclosed embodiments;

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1A:
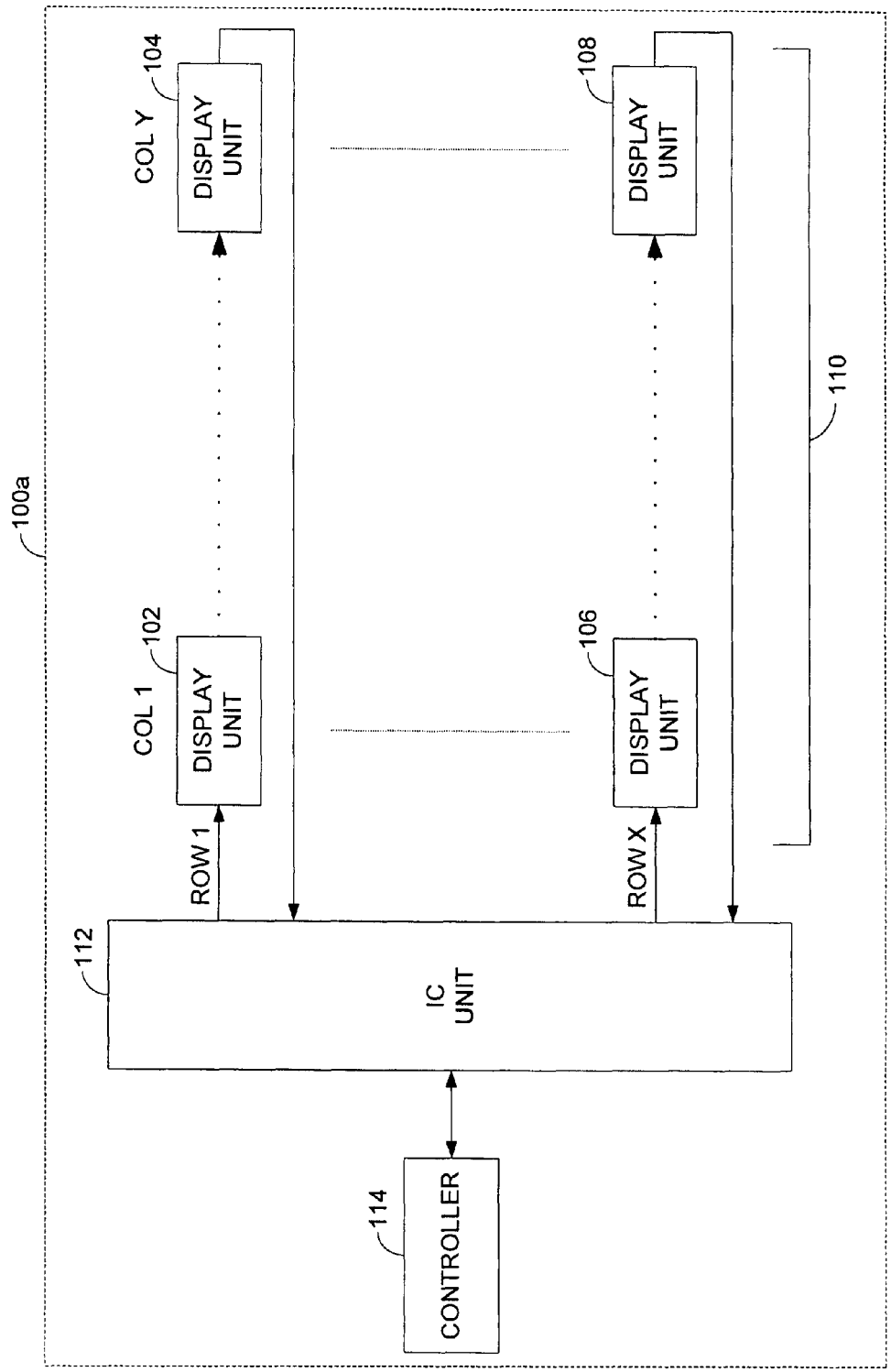
FIG. 1a shows a block diagram of an exemplary sign display panel consistent with certain disclosed embodiments.

FIG. 1a shows a block diagram of an exemplary dynamic message sign display panel 100a, consistent with certain disclosed embodiments. Sign display panel 100a may include controller 114, interconnect (IC) unit 112, and one or more display units 110.

Controller 114 may supply power and/or data signals to display units 110 through IC unit 112 and may further receive power and/or data signals from display units 110 through IC unit 112. In addition, controller 114 may send messages to and/or receive messages from display units 110 through IC unit 112. In one embodiment, controller 114 may be implemented to operate as a display unit 110 and may display a portion of the sign display panel message. Controller 114 may be connected to IC unit 112 by any suitable means for transmitting power and/or data. For example, controller 114, IC unit 112, and display units 110 may be connected by cables, copper wire, fiber optic lines, a wireless network, or the like. In one exemplary embodiment, data lines between controller 114, IC unit 112, and display units 110 may be doubled. That is, for each data line, at least one redundant data line may also be provided. In one exemplary embodiment, controller 114 may transmit digital data to and from display units 110. However, communications between controller 114, IC unit 112, and display units 110 may be analog or digital.

IC unit 112 may receive power and data signals, including messages, from controller 114 and may send these power and data signals to display units 110. IC unit 112 may also receive power and data signals from display units 110 and send these power and data signals to controller 114. In addition, IC unit 112 may send and receive power and/or data signals between display units 110. For example, IC unit 112 may receive power and/or data signals from, e.g., the last display unit in one row (e.g., display unit 104 in row 1, column Y), and may send the received power and/or data signals to the first display unit of the following row (e.g., display unit 106 at row X, column1).

Display units 110 may be arranged in any configuration and/or quantity. In one exemplary embodiment, as shown in FIG. 1a, display units 110 may be configured in a rectangular matrix of X rows and Y columns, where X and Y are integers greater than 1. The number of rows X and columns Y of the matrix may depend on the size of the sign display panel 100a. For example, FIG. 1a shows display unit 102 (row1, column1), display unit 104 (row1, column Y), display unit 106 (row X, column1), and display unit 108 (row X, column Y). However, display units 110 may be alternatively arranged in any quantity and/or configuration (including irregular configurations) as is understood by those of skill in the art. Each of the display units 110 may be responsible for producing patterns on a portion of the sign display panel 100a.

Display units 110 may be in communication with controller 114 so as to be controlled by controller 114. For example, controller 114 may communicate with display units 110 through IC unit 112. In addition, each display unit 110 may be in communication with one or more other display units 110. In some embodiments, the display units 110 in a particular row may be connected in series, with both the first and last display unit in the row being in communication with IC unit 112. As illustrated in FIG. 1a, for instance, a first display unit in a particular row, e.g., display unit 102 (row1, column1) may be in communication with both IC unit 112 and the next display unit in the row, e.g., a display unit at row1, column2 (not shown). The display unit at row1, column2 (not shown) may, in turn, be in communication with the display unit 102 (row1, column1) and the display unit at row1, column3 (not shown). The last display unit in a particular row, e.g., display unit 104 (row1, column Y), may be in communication with both the previous display unit in the row, e.g., the display unit at row1, column Y−1 (not shown), and IC unit 112. Display units 110 may communicate with each other and IC unit 112 by any suitable means for transmitting power and/or data, such as, for example, cable, copper wire, fiber optic lines, wireless networks, and the like. In one exemplary embodiment, display units 10 may communicate with each other via redundant communication lines.

Figure 1B:
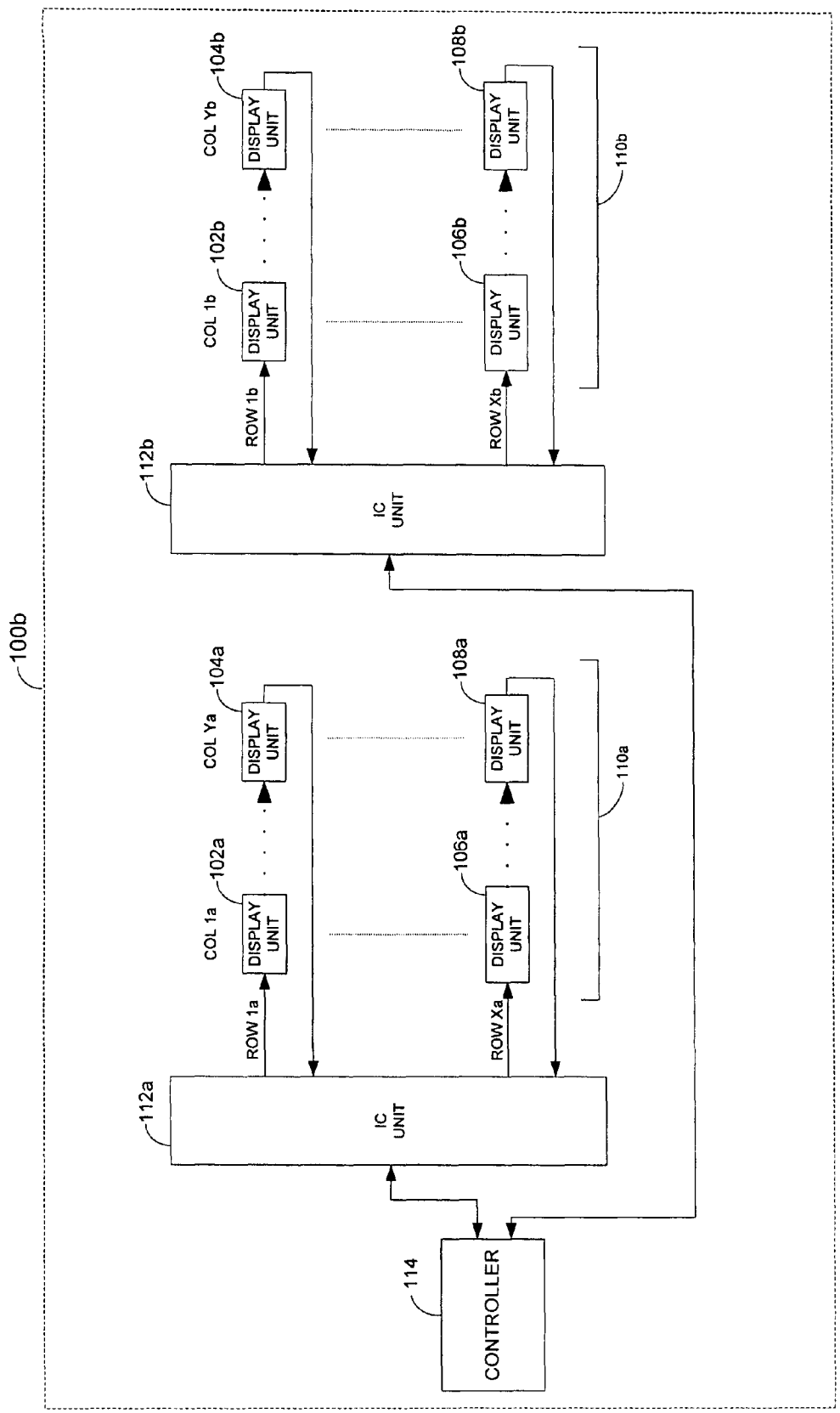
FIG. 1b shows a block diagram of an exemplary sign display panel consistent with certain disclosed embodiments.

Referring to FIG. 1b, there is shown a block diagram of an exemplary message sign display panel 100b, consistent with certain disclosed embodiments. In this configuration, sign display panel 100b may include controller 114, respective IC units 112a and 112b, and respective sets of display units 110a and 110b.

Controller 114 may supply power and/or data signals to display units 110a, and receive power and/or data signals from display units 110a through IC unit 112a. Similarly, controller 114 may supply power and/or data signals to display units 110b and receive power and/or data signals from display units 110b through IC unit 112b. In addition, controller 114 may send messages to and receive messages from display units 110a and 110b by means of IC units 112a and 112b, respectively. As in FIG. 1a, in one embodiment, controller 114 may be implemented to operate as a display unit 110 and may display a portion of the sign display panel message. Controller 114 may be in communication with IC units 112a and 112b, and to display units 110a and 110b, respectively, by any suitable means for transmitting and/or receiving power and/or data, such as, for example, cable, copper wire, fiber optic lines, wireless networks, and the like. In one exemplary embodiment, data lines between controller 114, respective IC units 112a and 112b, and respective display units 110a and 110b may be doubled. That is, for each data line, at least one redundant data line may also be provided. In one exemplary embodiment, controller 114 may transmit digital data to and from display units 110a and 110b. However, communications between controller 114, respective IC units 112a and 112b, and display units 110a and 110b may be analog or digital.

IC units 112a and 112b may receive power and data signals, including messages, from controller 114 and may send these power and data signals to display units 110a and/or 110b, respectively. IC units 112a and 112b may also receive power and data signals from display units 110a and 110b, respectively, and may send these power and data signals to controller 114. In addition, IC units 112a and 112b may send and receive power and/or data signals between display units 110a and 110b. For example, IC unit 112a may receive power and data signals from display unit 104a (row$1_a$, column $Y_a$), and may send the received power and data signals to the first display unit of the following row, e.g., a display unit at row$2_a$, column$1_a$ (not shown). Similarly, IC unit 112b may receive power and data signals from display unit 104b (row$1_b$, column $Y_b$), and may send the received power and data signals to the first display unit of the following row, e.g., a display unit at row$2_b$, column$1_b$ (not shown). In one exemplary embodiment, IC unit 112a may be configured to send and/or receive power and data signals between controller 114 and display units 110a. Similarly, IC unit 112b may be configured to send and/or receive power and data signals between controller 114 and display units 110b. In another embodiment, IC unit 112a may send and/or receive power and/or data signals associated with IC unit 112b and/or display units 110b. For example, IC unit 112a may be configured to send power signals to IC unit 112b and thereby to display units 110b. As another example, IC unit 112a may send data signals received from display unit 108a (row $X_a$, column $Y_a$) to IC unit 112b for further transmission to display unit 102b (row$1_b$, column$1_b$).

Display units 110a and 110b may be arranged in any configuration and/or quantity. In one embodiment, display units 110a may be arranged in a matrix having $X_a$ number of rows and $Y_a$ number of columns, and display units 110b may be arranged in a matrix having $X_b$ number of rows and $Y_b$ number of columns, where $X_a$, $X_b$, $Y_a$, and $Y_b$ are integers greater than 1. For example, FIG. 1b shows display unit 102a (row$1_a$, column$1_a$), display unit 104a (row$1_a$, column $Y_a$), display unit 106a (row $X_a$, column$1_a$), display unit 108a (row $X_a$, column $Y_a$), display unit 102b (row$1_b$, column$1_b$), display unit 104b (row$1_b$, column $Y_b$), display unit 106b (row$1_b$, column $Y_b$), display unit 108b (row $X_b$, column $Y_b$). Each of the display units 110a and 110b may produce patterns on a portion of sign display panel 100b.

Display units 110a may be in communication with and may be controlled by controller 114 by means of IC unit 112a. In addition, each display unit 110a may be in communication with one or more other display units 110a. For example, display unit 102a (row$1_a$, column$1_a$) may be in communication with IC unit 112a and a display unit at row$1_a$, column$2_a$ (not shown). The display unit at row$1_a$, column$2_a$ (not shown) may, in turn, be in communication with the display unit 102a (row$1_a$, column$1_a$) and a display unit at row$1_a$, column$3_a$ (not shown). Similarly, display unit 108a (row $X_a$, column $Y_a$) may be in communication with a display unit at row $X_a$, column $Y_a$–1 (not shown) and IC unit 112a. Similarly, display units 110b may be in communication with and may be controlled by controller 114. In one embodiment, controller 114 may be in communication with and may be in control of display units 110b via IC unit 112b. In addition, each display unit 110b may be in communication with one or more other display units 110b. For example, display unit 102b (row$1_b$, column$1_b$) may be in communication with IC unit 112b and a display unit at row$1_b$, column$2_b$ (not shown). Also, a display unit at row$1_b$, column $2_b$ (not shown) may, in turn, be in communication with display unit 102b (row $1_b$, column$1_b$) and a display unit at row$1_b$, column$3_b$ (not shown). Similarly, display unit 108b (row $X_b$, column $Y_b$) may be in communication with a display unit at row $X_b$, column $Y_b$–1 (not shown) and IC unit 112b. Display units 110a and 110b may be connected to each other and IC units 112a and 112b by any suitable means for transmitting power and/or data, such as, for example, cable, copper wire, fiber optic lines, wireless networks, and the like. In one exemplary embodiment, display units 110 may communicate with each other via redundant communication lines.

In one exemplary embodiment, display units 110a and 110b may be arranged horizontally to form a wide sign display panel 110b. For example, as in FIG. 1a, the number of rows, $X_a$ and $X_b$, and columns, $Y_a$ and $Y_b$, of the matrix depends on the desired size of a sign display panel 100b. That is, the width of sign display panel 100b may be the number of columns of display units 110a ($Y_a$) plus the number of columns of display units 110b ($Y_b$). Further, while it may be desirable and/or necessary in some configurations for the number of rows and/or columns associated with display units 110a and 110b to be equal (i.e., $X_a=X_b$, $Y_a=Y_b$), in other configurations it may be desirable and/or necessary that the number of rows and/or columns associated with display units 110a and 110b be unequal (i.e., $X_a \neq X_b$, $Y_a \neq Y_b$).

Figure 1C:
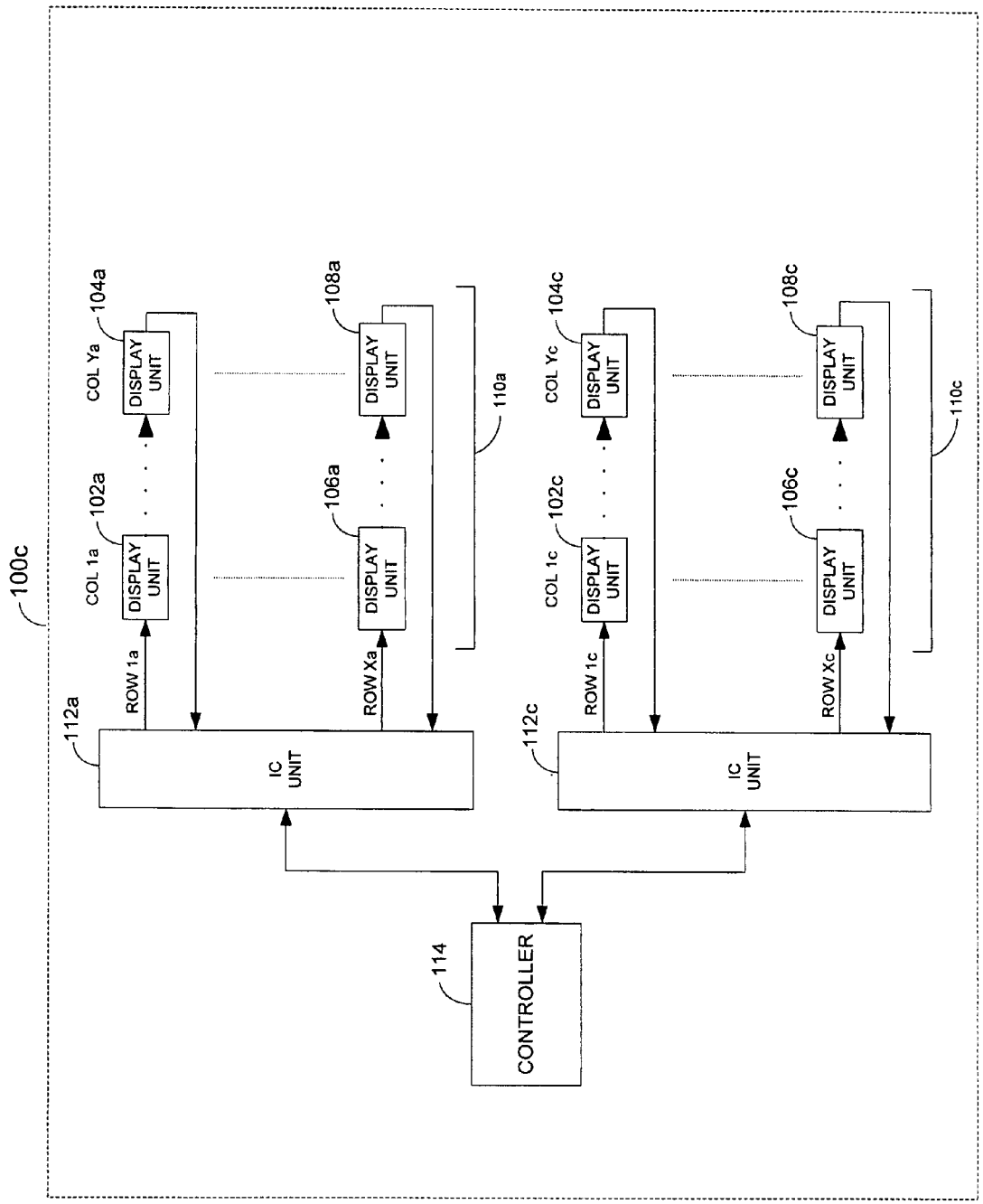
FIG. 1c shows a block diagram of an exemplary sign display panel consistent with certain disclosed embodiments.

FIG. 1c shows a block diagram of an exemplary message sign display panel 100c, consistent with certain disclosed embodiments. In this configuration, sign display panel 100c may include controller 114, IC units 112a and 112c, and a plurality of display units 110a and 110c.

Controller 114 may supply power and/or data signals to display units 110a, and may further receive power and/or data signals from display units 110a through IC unit 112a. Similarly, controller 114 may supply power and/or data signals to display units 110c and receive power and/or data signals from display units 110c through IC unit 112c. In addition, controller 114 may send messages to and receive messages from display units 110a and 110c by means of IC units 112a and 112c, respectively. As in FIG. 1a, in some embodiments, controller 114 may be implemented to operate as a display unit 110 and may display a portion of the sign display panel message. Controller 114 may be in communication with IC units 112a and 112c by any suitable means for transmitting power and/or data. For example, controller 114, respective IC units 112a and 112c, and respective display units 110a and 110c may be in communication by means of cable, copper wire, fiber optic lines, a wireless network, or the like. In one exemplary embodiment, data lines between controller 114, respective IC units 112a and 112c, and respective display units 110a and 110c may be doubled. That is, for each data line, at least one redundant data line may also be provided. In one exemplary embodiment, controller 114 may transmit digital data to and from display units 110a and 110c. However, communications between controller 114, respective IC units 112a and 112c, and display units 110a and 110c may be analog or digital.

IC units 112a and 112c may receive power and data signals, including messages, from controller 114 and may send these power and data signals to display units 110a and/or 110c, respectively. IC units 112a and 112c may also receive power and data signals from display units 110a and 110c, respectively, and may send these power and data signals to controller 114. In addition, IC units 112a and 112c may send and receive power and/or data signals between display units 110a and 110c. For example, IC unit 112a may receive power and data signals from display unit 104a (row$1_a$, column $Y_a$) and may send the received power and data signals to the first display unit located in the next row, e.g., a display unit at row$2_a$, column$1_a$ (not shown). Similarly, IC unit 112c may receive power and data signals from display unit 104c (row$1_c$, column $Y_c$), and may send the received power and data signals to the first display unit located in the next row, e.g., a display unit at row$2_c$, column1c (not shown). In one exemplary embodiment, IC unit 112a may be configured to send and/or receive power and data signals between controller 114 and display units 110a, but may not be configured to send and/or receive power or data signals associated with IC unit 112c and/or display units 110c. Similarly, IC unit 112c may be configured to send and/or receive power and data signals between controller 114 and display units 110c, but may not be configured to send and/or receive power and/or data signals associated with IC unit 112a and/or display units 110a. In another embodiment, IC unit 112a may send and/or receive power and/or data signals associated with IC unit 112c and/or display units 110c. For example, IC unit 112a may be configured to send power signals to IC unit 112c and thereby to display units 110c. As another example, IC unit 112a may send data signals received from display unit 108a (row $X_a$, column $Y_a$) to IC unit 112c for further transmission to display unit 102c (row$1_c$, column$1_c$).

Display units 110a and 110c may be arranged in any configuration and/or quantity. In one embodiment, display units 110a may be arranged in a matrix having $X_a$ number of rows and $Y_a$ number of columns, and display units 110c may be arranged in a matrix having $X_c$ number of rows and $Y_c$ number of columns, where $X_a$, $X_c$, $Y_a$, and $Y_c$ are integers greater than 1. For example, FIG. 1c shows display unit 102a (row$1_a$, column$1_a$), display unit 104a (row$1_a$, column $Y_a$), display unit 106a (row $X_a$, column$1_a$), display unit 108a (row $X_a$, column $Y_a$), display unit 102c (row$1_c$, column$1_c$), display unit 104c (row $X_c$, column$1_c$), display unit 106c (row $X_c$, column$1_c$), display unit 108c (row $X_c$, column $Y_c$). Each of the display units 110a and 110c may produce one or more patterns on a portion of the sign display panel 100c.

Display units 110a may be in communication with and may be controlled by controller 114. In one embodiment, display units 110a may be controlled by controller 114 via IC unit 112a. In addition, each display unit 110a may be in communication with one or more other display units 110a. For example, display unit 102a (row$1_a$, column$1_a$) may be in communication with IC unit 112a and the display unit at row $1_a$, column$2_a$ (not shown). A display unit at row$1_a$, column$2_a$ (not shown) may, in turn, be in communication with display unit 102a (row$1_a$, column$1_a$) and a display unit at row$1_a$, column$3_a$ (not shown). Display unit 108a (row $X_a$, column $Y_a$) may be in communication with a display unit at row $X_a$, column$Y_a$–1 (not shown) and IC unit 112a. Similarly, display units 110c may be in communication with and may be controlled by controller 114. In one embodiment, display units 110c may be controlled by controller 114 via IC unit 112c. In addition, each display unit 110c may be in communication with one or more other display units 110c. For example, display unit 102c (row$1_c$, column$1_c$) may be in communication with IC unit 112c and a display unit at row$1_c$, column$2_c$ (not shown). A display unit at row$1_c$, column$2_c$ (not shown) may, in turn, be in communication with display unit 102c (row$1_c$, column $1_c$) and a display unit at row$1_c$, column$3_c$ (not shown). Similarly, display unit 108c (row $X_c$, column $Y_c$) may be in communication with a display unit at row $X_c$, column $Y_c$–1 (not shown) and IC unit 112c. Display units 110a and 110c may be connected to each other and IC units 112a and 112c by any suitable means for transmitting power and/or data, such as, for example, cable, copper wire, fiber optic lines, wireless networks, and the like. In one exemplary embodiment, display units 110 may communicate with each other via redundant communication lines.

In one embodiment, display units 110a and 110c may be arranged vertically, as shown, to form a tall sign display panel. The number of rows, $X_a$ and $X_c$, may vary depending on the size of sign display panel 100c. For example, the height of sign display panel 100c may be based on the number of rows of display units 110a ($X_a$) and the number of rows of display units 110c ($X_c$). Further, while the number of rows and/or columns associated with display units 110a and 110c may be equal (e.g., $X_a=X_c$, $Y_a=Y_c$, etc.), other configurations may be implemented that vary the number of rows and/or columns associated with display units 110a and 110c to be unequal (e.g., $X_a \ne X_c$, $Y_a \ne Y_c$, etc.).

Figure 1D:
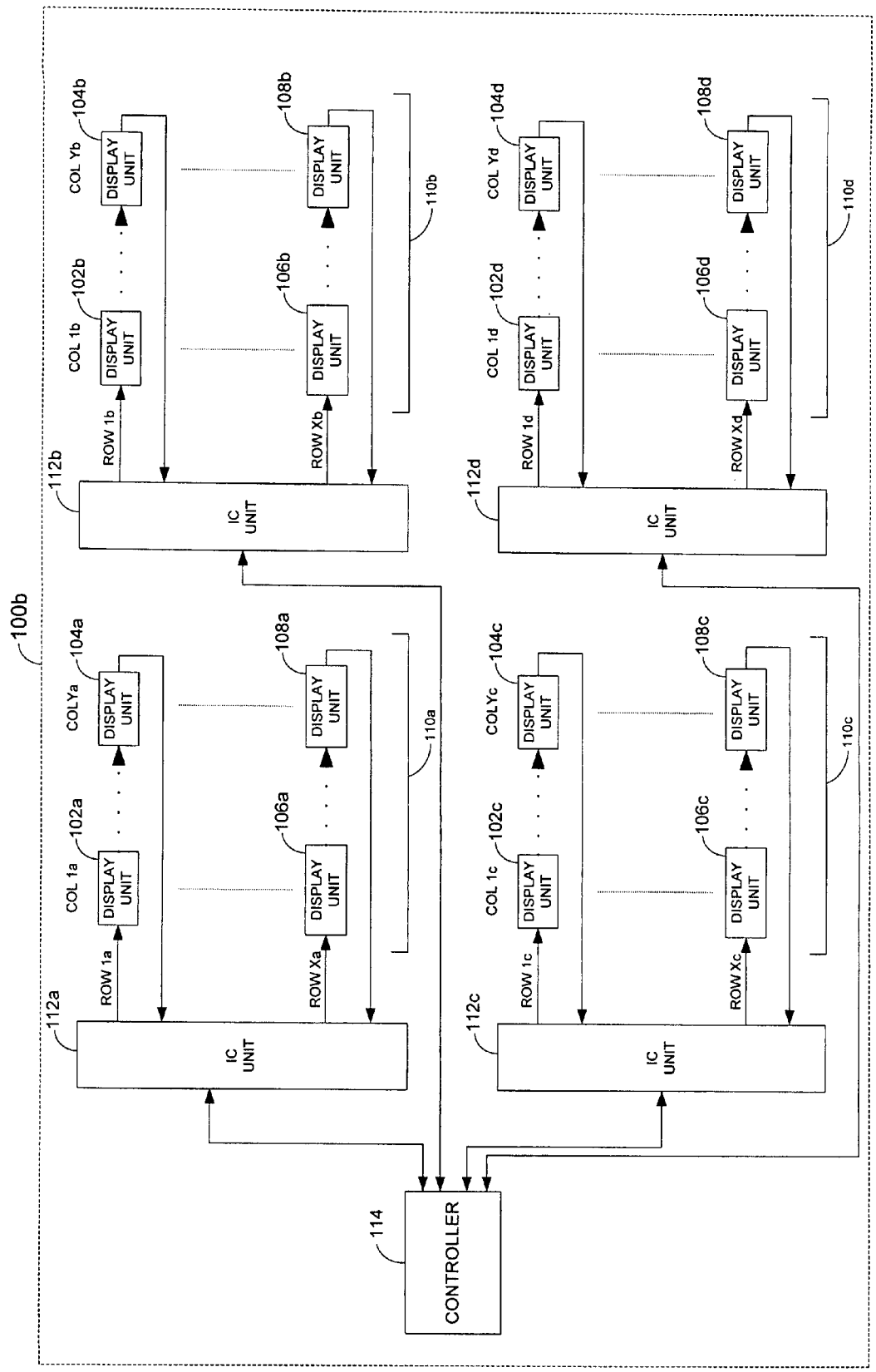
FIG. 1d shows a block diagram of an exemplary sign display panel consistent with certain disclosed embodiments.

FIG. 1d shows a block diagram of an exemplary message sign display panel 100d, consistent with certain disclosed embodiments. In this configuration, sign display panel 100d may include controller 114, IC units 112a, 112b, 112c, and 112d, and a plurality of display units 110a, 110b, 110c, and 110d.

Controller 114 may supply power and/or data signals to display units 110a, 110b, 110c, and 110d through IC units 112a, 112b, 112c, and 112d, respectively. Similarly, controller 114 may receive power and/or data signals from display units 110a, 110b, 110c, and 110d through IC units 112a, 112b, 112c, and 112d, respectively. In addition, controller 114 may send messages to and receive messages from display units 110a, 110b, 110 c, and 110d via IC units 112a, 112b, 112c, and 112d, respectively. As in FIGS. 1a and 1b, in some embodiments, controller 114 may be implemented to operate as any display unit in display unit 110a, 110b, 110c, or 110d, and may display a portion of the sign. Controller 114 may be in communication with IC units 112a, 112b, 112c, and 112d, and thereby to display units 110a, 110b, 110c, and 110d, respectively, by any suitable means for transmitting power and/or data. For example, controller 114, respective IC units 112a, 112b, 112c, and 112d, and respective display units 110a, 110b, 110c, and 110d may be in communication by means of cable, copper wire, fiber optic lines, a wireless network, or the like. In one exemplary embodiment, data lines between controller 114, respective IC units 112a, 112b, 112c, and 112d, and respective display units 110a, 110b, 110c, and 110d may be doubled. That is, for each data line, at least one redundant data line may also be provided. In one exemplary embodiment, controller 114 may transmit digital data to and from display units 110a, 110b, 110c, and 110d. However, communications between controller 114, respective IC units 112a, 112b, 112c, and 112d, and display units 110a, 110b, 110c, and 110d may be analog and/or digital.

IC units 112a, 112b, 112c, and 112d may receive power and data signals, including messages, from controller 114 and may send these power and data signals to display units 110a, 110b, 110c, and 110d, respectively. IC units 112a, 112b, 112c, and 112d may also receive power and data signals from display units 110a, 110b, 110c, and 110d, respectively, and may send these power and data signals to controller 114. In addition, IC units 112a, 112b, 112c, and 112d may send and receive power and/or data signals between display units 110a, 110b, 110c, and 110d. For example, IC unit 112a may receive power and data signals from display unit 104a (row$1_a$, column $Y_a$), and may send the received power data signals to the first display unit of the following row, e.g., a display unit at row$2_a$, column$1_a$ (not shown). As a further example, IC unit 112b may receive power and data signals from display unit 104b (row$1_b$, column $Y_b$), and may send the received power data signals to the first display unit of the following row, e.g., a display unit at row$2_b$, column$1_b$ (not shown). Similarly, for example, IC unit 112c may receive power and data signals from display unit 104c (row$1_c$, column $Y_c$), and may send the received power data signals to the first display unit of the following row, e.g., a display unit at row$2_c$, column$1_c$ (not shown). As an additional example, IC unit 112d may receive power and data signals from display unit 104d (row$1_d$, column $Y_d$), and may send the received power data signals to the first display unit of the following row, e.g., a display unit at row$2_d$, column$1_d$ (not shown). In one exemplary embodiment, IC unit 112a may be configured to send and/or receive power and data signals between controller 114 and display units 110a. Similarly, IC unit 112b may be configured to send and/or receive power and data signals between controller 114 and display units 110b. Further, IC unit 112c may be configured to send and/or receive power and data signals between controller 114 and display units 110c. In addition, IC unit 112d may be configured to send and/or receive power and data signals between controller 114 and display units 110d. In other embodiments, IC units 112a may send and/or receive power and/or data signals associated with IC units 112b, 112c, and 112d and/or display units 110b, 110c, and 110d. For example, IC unit 112a may be configured to send power signals to IC unit 112b and to display units 110b. As another example, IC unit 112a may send data signals received from display unit 108a (row $X_a$, column $Y_a$) to IC unit 112b for further transmission to display unit 102b (row$1_b$, column$1_b$). Similarly, for example, IC unit 112b may send data signals received from display unit 108b (row $X_b$, column $Y_b$) to IC unit 112c for further transmission to display unit 102c (row$1_c$, column$1_c$).

Display units 110a, 110b, 110 c, and 110d may be arranged in any configuration and/or quantity as is understood by those of skill in the art. In one embodiment, display units 110a may be arranged in a matrix having $X_a$ number of rows and $Y_a$ number of columns, display units 110b may be arranged in a matrix having $X_b$ number of rows and $Y_b$ number of columns, display units 110c may be arranged in a matrix having $X_c$ number of rows and $Y_c$ number of columns, and display units 110d may be arranged in a matrix having $X_d$ number of rows and $Y_d$ number of columns. $X_a$, $X_b$, $X_c$, $X_d$, $Y_a$, $Y_b$, $Y_c$ and $Y_d$ are integers greater than 1. For example, FIG. 1d shows display unit 102a (row$1_a$, column$1_a$), display unit 104a (row $X_a$, column$1_a$), display unit 106a (row $X_a$, column$1_a$), display unit 108a (row $X_a$, column $Y_a$), display unit 102b (row$1_b$, column$1_b$), display unit 104b (row $X_b$, column$1_b$), display unit 106b (row $X_b$, column$1_b$), display unit 108b (row $X_b$, column $Y_b$), display unit 102c (row$1_c$, column$1_c$), display unit 104c (row $X_c$, column$1_c$), display unit 106c (row $X_c$, column$1_c$), display unit 108c (row $X_c$, column $Y_c$), display unit 102d (row$1_d$, column$1_d$), display unit 104d (row $X_d$, column$1_d$), display unit 106d (row $X_d$, column$1_d$), and display unit 108d (row $X_d$, column $Y_d$).

Display units 110a may be in communication with and may be controlled by controller 114. In one embodiment, display units 110a may be controlled by controller 114 via IC unit 112a. In addition, each display unit 110a may be in communication with one or more other display units 110a. For example, display unit 102a (row$1_a$, column$1_a$) may be in communication with IC unit 112a and a display unit at row$1_a$, column$2_a$ (not shown). A display unit at row$1_a$, column$2_a$ (not shown) may be in communication with display unit 102a (row$1_a$, column$1_a$) and a display unit at row$1_a$, column$3_a$ (not shown). Display unit 108a (row $X_a$, column $Y_a$) may be in communication with a display unit at row $X_a$, column $Y_a$−1 (not shown) and IC unit 112a. Similarly, display units 110b may be in communication with and may be controlled by controller 114. In one embodiment, display units 110b may be controlled by controller 114 via IC unit 112b. In addition, each display unit 110b may be in communication with one or more other display units 110b. For example, display unit 102b (row$1_b$, column$1_b$) may be in communication with IC unit 112b and a display unit at row$1_b$, column$2_b$ (not shown). The display unit at row$1_b$, column$2_b$ (not shown) may be in communication with display unit 102b (row$1_b$, column$1_b$) and a display unit at row$1_b$, column$3_b$ (not shown). Similarly, display unit 108b (row $X_b$, column $Y_b$) may be in communication with a display unit at row $X_b$, column $Y_b$−1 (not shown) and IC unit 112b.

In addition, display units 110c may be in communication with and may be controlled by controller 114. In one embodiment, display units 110c may be controlled by controller 114 via IC unit 112c. In addition, each display unit 110c may be in communication with one or more other display units 110c. For example, display unit 102c (row$1_c$, column$1_c$) may be in communication with IC unit 112c and a display unit at row$1_c$, column$2_c$ (not shown). A display unit at row$1_c$, column$2_c$ (not shown) may be in communication with display unit 102c (row$1_c$, column$1_c$) and a display unit at row$1_c$, column$3_c$ (not shown). Similarly, display unit 108c (row $X_c$, column $Y_c$) may be in communication with a display unit at row $X_c$, column $Y_c$−1 (not shown) and IC unit 112c. Further, display units 110d may be in communication with and may be controlled by controller 114. In one embodiment, display units 110d may be controlled by controller 114 via IC unit 112d. In addition, each display unit 110d may be in communication with one or more other display units 110d. For example, display unit 102d (row$1_d$, column$1_d$) may be in communication with IC unit 112d and a display unit at row$1_d$, column$2_d$ (not shown). A display unit at row$1_d$, column$2_d$ (not shown) may be in communication with display unit 102d (row$1d$, column$1d$) and a display unit at row$1d$, column$3_d$ (not shown). Similarly, display unit 108d (row $X_d$, column $Y_d$) may be in communication with a display unit at row $X_d$, column $Y_d$−1 (not shown) and IC unit 112d. Display units 110a, 110b, 110c, and 110d may be in communication with each other and IC units 112a, 112b, 112c, and 112d by any suitable means for transmitting power and/or data, such as, for example, cable, copper wire, fiber optic lines, wireless networks, and the like. In one exemplary embodiment, display units 110 may communicate with each other via redundant communication lines.

In one embodiment, display units 110a, 110b, 110c, 110d may be arranged in a vertical-horizontal configuration, as shown, to form a sign display panel having both increased display height and width. As in FIGS. 1a, 1b, and 1c, the number of rows, $X_a$, $X_b$, $X_c$, and $X_d$, and columns, $Y_a$, $Y_b$, $Y_c$, and $Y_d$, of the matrix may depend on the size of the sign display panel 100d. For example, the height of sign display panel 100d may be based on the number of rows of display units 110a ($X_a$) and the number of rows of display units 110c ($X_c$), and the width of sign display panel 100d may be based on the number of rows of display units 110a ($X_a$) and the number of rows of display units 110b ($X_b$). Further, in some embodiments, the number of columns and/or rows associated with display units 110a, 110b, 110c, and 110d may be equal (i.e., $X_a=X_b=X_c=X_d$, $Y_a=Y_b=Y_c=Y_d$), in other embodiments the number of columns and/or rows associated with display units 110a, 110b, 110 c, and 110d may be unequal (e.g., $X_a \neq X_c \neq X_c \neq X_d$, $Y_a \neq Y_b \neq Y_c \neq Y_d$, etc.).

According to certain disclosed embodiments, any shape of a sign display panel may be created by varying the configurations exemplified in FIGS. 1a, 1b, 1c, and 1d. For example, sign display panel 110d may include IC units 112a, 112b, and 112c and their associated display units 110a, 110b, and 110c. Similarly, sign display panel 110d may include IC units 112a, 112c, and 112d and their associated display units 110a, 110 c, and 110d. In addition, the width of sign display panels 100a, 100b, 100c, and 100d and height of sign display panels 100a, 100b, 100c, and 100d may be changed by further addition of IC units 112 and associated display units 110.

In another embodiment, one or more IC units 112 and associated display units 110 may be positioned such that they face in different directions. For example, IC unit 112a and associated display units 110a may be positioned at any angle relative to IC unit 112b and associated display units 110b. In one exemplary embodiment, IC unit 112a and associated display units 110a may be positioned behind IC unit 112b and associated display units 110b, and may face in opposing directions. Similarly, IC unit 112a and associated display units 110a may be positioned at any angle relative to IC unit 112c and associated display units 110c. For example, IC unit 112a and associated display units 110a may be positioned in parallel to IC unit 112c, and associated display units 110c and may be positioned to display perpendicular to one another. Also, display units 110 may be positioned to provide a curved sign display panel 100 by positioning each display unit 110 at an angle relative to one or more of its neighboring display units 110 or through the implementation of curved display units 110.

FIG. 2a shows a process flow diagram of an exemplary communication network for a sign display panel, consistent with certain disclosed embodiments. FIG. 2a shows display units 110, IC unit 112, and the controller 114 (as shown in FIG. 1a) in a communication network. Controller 114 and display units 110 may communicate with each other in a directional ring via IC unit 112. Accordingly, controller 114 may send information to display unit 102 (row1, column1) and receive information from display unit 108 (row X, column Y) through IC unit 112. Each display unit may receive information from a display unit in the previous column (e.g., a display unit at row X, column Y) and send information to the display unit in the next column (e.g., a display unit at row X, column Y+1). The last display unit in a row may send information to the first display unit in the next row through IC unit 112. Thus, for example, display unit 104 (row1, column Y) may send information to a display unit in row2, column1 (not shown) through IC unit 112. Similarly, display unit 106 (row X, column1) may receive information from a display unit in column Y of the previous row (not shown) through IC unit 112 and send information to a display unit in row X, column2 (not shown). Finally, display unit 108 (row X, column Y) may receive information from the display unit in the previous column of row X (not shown) and send information back to controller 114 through IC unit 112. Thus, in one embodiment, power and/or data may be sent serially through the network from the controller 114 to each of the display units 110 by means of IC unit 112. Alternatively and/or additionally, communication may flow in a reverse order to that described above with respect to FIG. 2a. That is, serial communications from controller 114 may flow from controller 114 through IC unit 112 to display unit 108, and from display unit 102 through IC unit 112 to controller 114.

In an alternate embodiment, referring to FIG. 1a, controller 114 and each row of display units 110 may communicate with each other in a directional ring via IC unit 112. Accordingly, controller 114 may send information to display unit 102 (row1, column1) and receive information from display unit 104 (row1, column Y) through IC unit 112. Each display unit in a row may receive information from a display unit in the previous column in the same row, and send information to the display unit in the next column in the same row. The last display unit in the row may send information to controller 114 through IC unit 112. Thus, for example, display unit 102 (row1, column1) may receive information from controller 114 by means of IC unit 112, and send information to a display unit in row1, column2 (not shown). Display unit 104 (row1, column Y) may receive information from a display unit in the previous column of row1 (not shown), and send the information to controller 114 by means of IC unit 112. Similarly, display unit 106 (row X, column1) may receive information from controller 114 by means of IC unit 112, and send information to a display unit in the next column of row X (not shown). Display unit 108 (row X, column Y) may receive information from the display unit in the previous column of row X (not shown), and send information to controller 114 through IC unit 112. Thus, in one embodiment, power and/or data may be sent serially through the network from the controller 114 to each row of display units 110 by means of IC unit 112. Alternatively and/or additionally, communication may flow in a reverse order to that described above with respect to FIG. 1a. That is, serial communications from controller 114 may flow from controller 114 through IC unit 112 to display unit 108, through each display unit from display unit 108 to display unit 106, and from display unit 106 through IC unit 112 to controller 114. Similarly, serial communications from controller 114 may flow from controller 114 through IC unit 112 to display unit 104, through each display unit from display unit 104 to display unit 102, and from display unit 102 through IC unit 112 to controller 114. Thus, each row of display units 110 may receive data from controller 114 through IC unit 112 in parallel with every other row of display units 110, with each row forming a closed serial loop. Additionally, two or more rows may be combined to form a closed serial loop within any one or more of the larger closed serial loops.

Figure 2B:
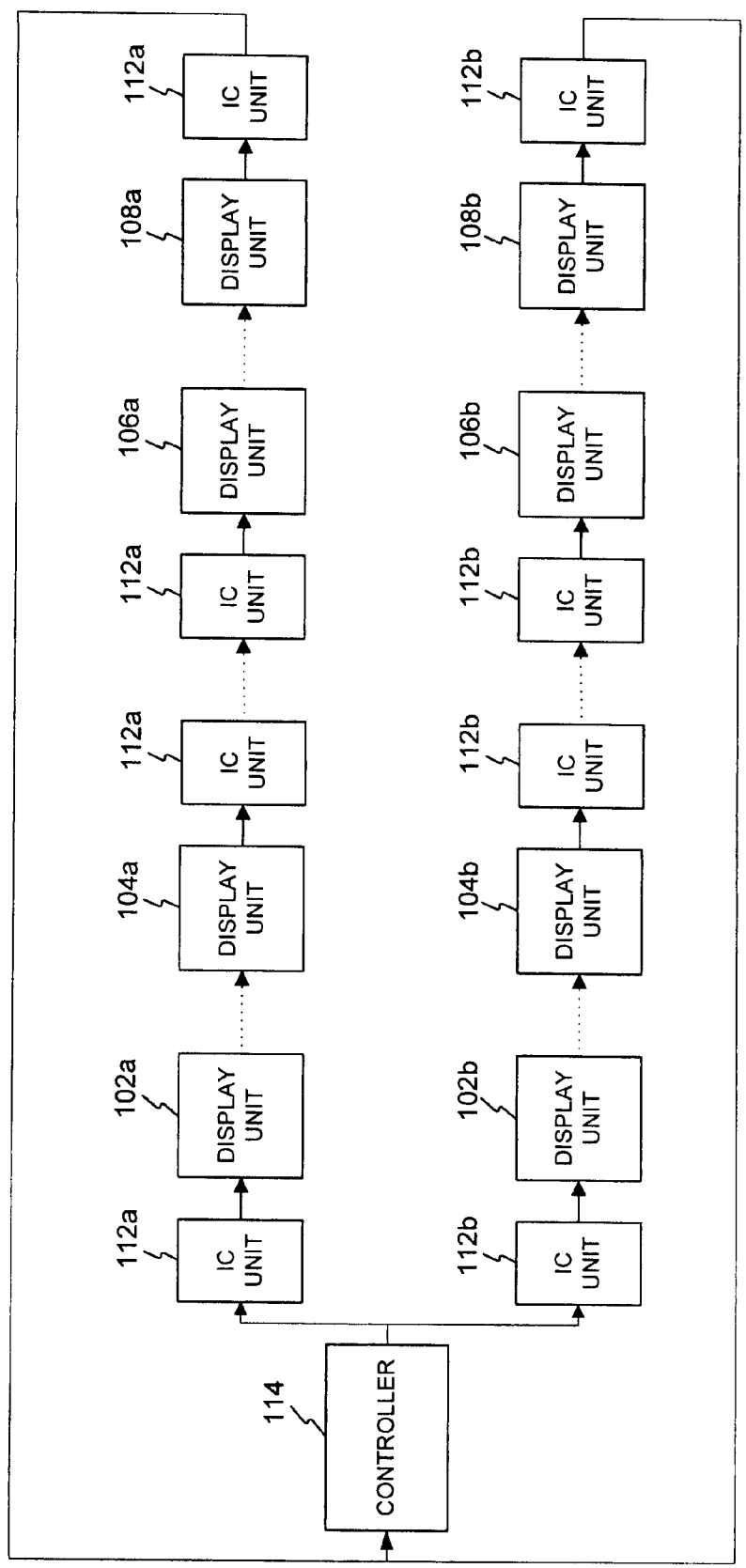
FIG. 2b shows a block diagram of an exemplary communication network for a sign display panel consistent with certain disclosed embodiments.

FIG. 2b shows a process flow diagram of an exemplary communication network for a sign display panel, consistent with certain disclosed embodiments. FIG. 2b shows each of the display units 110a and 110b, IC units 112a and 112b, and the controller 114 (as shown in FIG. 1b) in a communication network.

Controller 114 and display units 110a may communicate with each other in a directional ring via IC unit 112a. Controller 114 may also communicate with display units 110b in a directional ring via IC unit 112b. Thus, controller 114 may send data and/or power signals to display units 110a and 110b in parallel by means of IC units 112a and 112b, respectively. Accordingly, controller 114 may send data and/or power signals to display unit 102a (row$1_a$, column$1_a$) and receive data and/or power signals from display unit 108a (row $X_a$, column $Y_a$) through IC unit 112a. Each display unit may receive data and/or power signals from the display unit in the previous column (e.g., a display unit at row $X_a$, column $Y_a$), and send data and/or power signals to the display unit in the next column (e.g., a display unit at row $X_a$, column $Y_a$+1). The last display unit in a row may send data and/or power signals to the first display unit in the next row via IC unit 112a. Thus, for example, display unit 104a (row$1_a$, column $Y_a$) may send data and/or power signals to a display unit in row$2_a$, column$1_a$ (not shown) through IC unit 112a. Display unit 106a (row $X_a$, column$1_a$) may receive data and/or power signals from a display unit in column $Y_a$ of the previous row (not shown) through IC unit 112a and send data and/or power signals to a display unit in row $X_a$, column$2_a$ (not shown). Display unit 108a (row $X_a$, column $Y_a$) may receive data and/or power signals from a display unit in the previous column of row $X_a$ (not shown) and send data and/or power signals back to controller 114 through IC unit 112a.

Similarly, controller 114 may send data and/or power signals to display unit 102b (row$1_b$, column$1_b$) and receive data and/or power signals from display unit 108b (row $X_b$, column $Y_b$) through IC unit 112b. Each display unit may receive data and/or power signals from the display unit in the previous column (e.g., a display unit at row $X_b$, column $Y_b$) and send data and/or power signals to the display unit in the next column (e.g., a display unit at row $X_b$, column $Y_b$+1). The last display unit in a row may send data and/or power signals to the first display unit in the next row by means of IC unit 112b. Thus, for example, display unit 104b (row$1_b$, column $Y_b$) may send data and/or power signals to a display unit in row$2_b$, column$1_b$ (not shown) through IC unit 112b. Display unit 106b (row $X_b$, column$1_b$) may receive data and/or power signals from a display unit in column $Y_b$ of the previous row (not shown) through IC unit 112b and send data and/or power signals to a display unit in row $X_b$, column$2_b$ (not shown).

Display unit 108b (row $X_b$, column $Y_b$) may receive data and/or power signals from a display unit in the previous column of row $X_b$ (not shown) and send data and/or power signals back to controller 114 through IC unit 112b.

In one embodiment, data and/or power signals may be transmitted from the controller 114 in parallel to each of IC units 112a and 112b, which may in turn send the data and/or power signals serially to display units 110a and 110b. Thus, controller 114, IC unit 112a, and display units 110a may form a first closed serial loop, and controller 114, IC unit 112b, and display units 110b may form a second closed serial loop. Alternatively and/or additionally, communication may flow in a reverse order to that described above with respect to FIG. 2b. That is, serial communication from controller 114 may flow through IC units 112a and 112b to display units 108a and 108b, respectively, and may flow from display units 102a and 102b through IC units 112a and 112b, respectively, to controller 114.

In an alternate embodiment, referring to FIG. 1b, controller 114 and each row of display units 110a may communicate with each other in a directional ring via IC unit 112a. Accordingly, controller 114 may send information to display unit 102a (row $1_a$, column $1_a$) and receive information from display unit 104a (row $1_a$, column $Y_a$) through IC unit 112a. Each display unit in a row may receive information from a display unit in the previous column in the same row, and send information to the display unit in the next column in the same row. The last display unit in the row may send information to controller 114 through IC unit 112a. Thus, for example, display unit 102a (row $1_a$, column $1_a$) may receive information from controller 114 by means of IC unit 112a, and send information to a display unit in row $1_a$, column $2_a$ (not shown). Display unit 104a (row $1_a$, column $Y_a$) may receive information from a display unit in the previous column of row $1_a$ (not shown), and send the information to controller 114 by means of IC unit 112a. Similarly, display unit 106a (row $X_a$, column $1_a$) may receive information from controller 114 by means of IC unit 112a, and send information to a display unit in the next column of row $X_a$ (not shown). Display unit 108a (row $X_a$, column $Y_a$) may receive information from the display unit in the previous column of row $X_a$ (not shown), and send information to controller 114 through IC unit 112a. Thus, in one embodiment, power and/or data may be sent serially through the network from the controller 114 to each row of display units 110a by means of IC unit 112a. Alternatively and/or additionally, communication may flow in a reverse order to that described above with respect to FIG. 1b. That is, serial communications from controller 114 may flow from controller 114 through IC unit 112a to display unit 108a, through each display unit from display unit 108a to display unit 106a, and from display unit 106a through IC unit 112a to controller 114. Similarly, serial communications from controller 114 may flow from controller 114 through IC unit 112a to display unit 104a, through each display unit from display unit 104a to display unit 102a, and from display unit 102a through IC unit 112a to controller 114. Thus, each row of display units 110a may receive data from controller 114 through IC unit 112a in parallel with every other row of display units 110a, with each row forming a closed serial loop.

Similarly, controller 114 and each row of display units 110b may communicate with each other in a directional ring via IC unit 112b. Accordingly, controller 114 may send information to display unit 102b (row $1_b$, column $1_b$) and receive information from display unit 104b (row $1_b$, column $Y_b$) through IC unit 112b. Each display unit in a row may receive information from a display unit in the previous column in the same row, and send information to the display unit in the next column in the same row. The last display unit in the row may send information to controller 114 through IC unit 112b. Thus, for example, display unit 102b (row $1_b$, column $1_b$) may receive information from controller 114 by means of IC unit 112b, and send information to a display unit in row $1_b$, column $2_b$ (not shown). Display unit 104b (row $1_b$, column $Y_b$) may receive information from a display unit in the previous column of row $1_b$ (not shown), and send the information to controller 114 by means of IC unit 112b. Similarly, display unit 106b (row $X_b$, column $1_b$) may receive information from controller 114 by means of IC unit 112b, and send information to a display unit in the next column of row $X_b$ (not shown). Display unit 108b (row $X_b$, column $Y_b$) may receive information from the display unit in the previous column of row $X_b$ (not shown), and send information to controller 114 through IC unit 112b. Thus, in one embodiment, power and/or data may be sent serially through the network from the controller 114 to each row of display units 110b by means of IC unit 112b. Alternatively and/or additionally, communication may flow in a reverse order to that described above with respect to FIG. 1b. That is, serial communications from controller 114 may flow from controller 114 through IC unit 112b to display unit 108b, through each display unit from display unit 108b to display unit 106b, and from display unit 106b through IC unit 112b to controller 114. Similarly, serial communications from controller 114 may flow from controller 114 through IC unit 112b to display unit 104b, through each display unit from display unit 104b to display unit 102b, and from display unit 102b through IC unit 112b to controller 114. Thus, each row of display units 110b may receive data from controller 114 through IC unit 112b in parallel with every other row of display units 110b, with each row forming a closed serial loop.

Data and/or power signals may be transmitted from the controller 114 in parallel to each of IC units 112a and 112b, which may in turn send the data and/or power signals serially to display units 110a and 110b. Controller 114, IC unit 112a, and display units 110a may thereby form a first closed serial loop, and controller 114, IC unit 112b, and display units 110b may form a second closed serial loop. In addition, each row of display units 110a may form a set of closed serial loops within the first closed serial loop, and each row of display units 110b may form a set of closed serial loop within the second closed serial loop. In such an embodiment, the number of closed serial loops in the set of closed serial loops within the first closed serial loop may correspond to the number of row of display units 110a. Similarly, the number of closed serial loops in the set of closed serial loops within the second closed serial loop may correspond to the number of row of display units 110b. Alternatively and/or additionally, communication may flow in a reverse order to that described above with respect to FIG. 1b. Additionally, two or more rows may be combined to form a closed serial loop within any one or more of the larger closed serial loops.

Figure 2C:
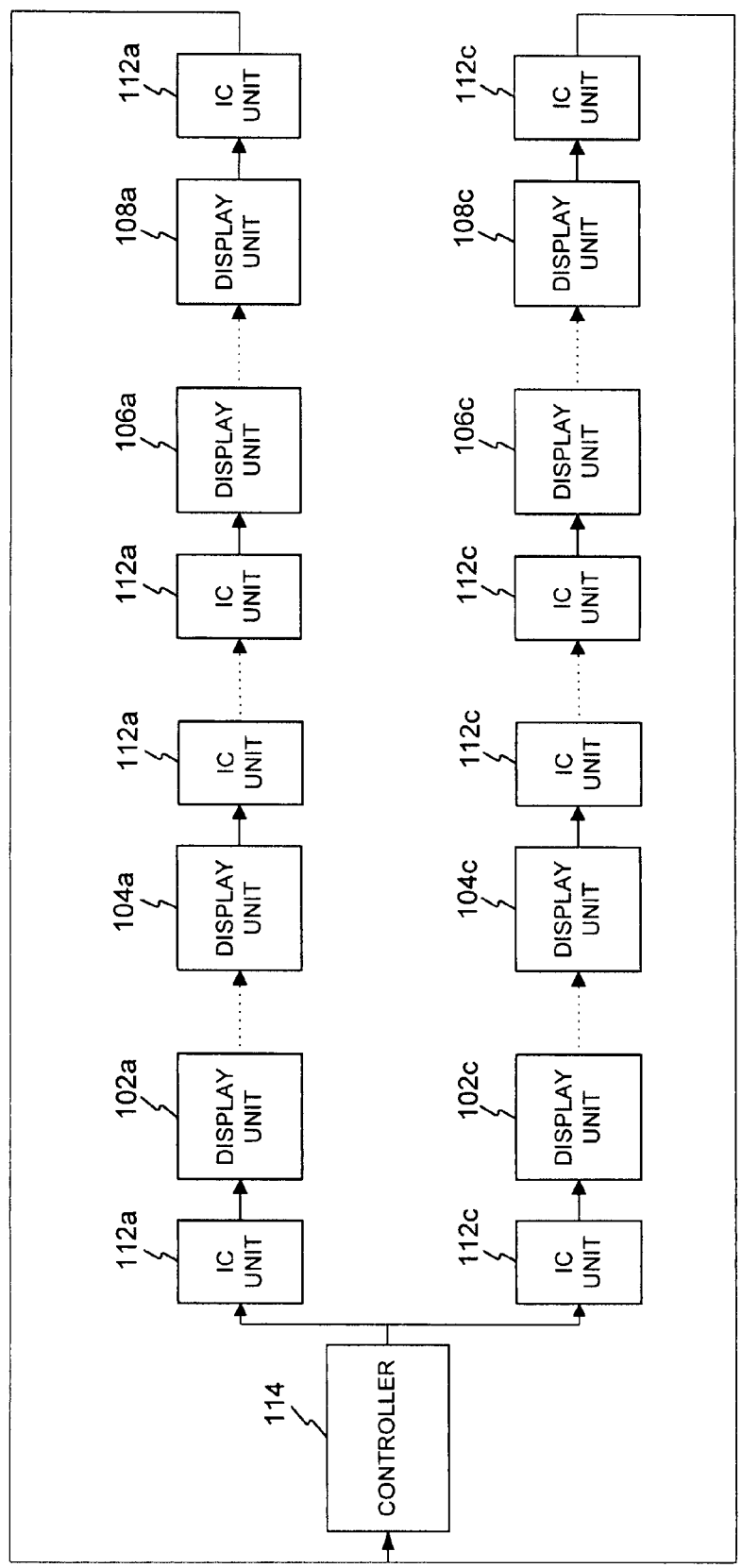
FIG. 2c shows a block diagram of an exemplary communication network for a sign display panel consistent with certain disclosed embodiments.

FIG. 2c shows a process flow diagram of an exemplary communication network for a sign display panel, consistent with certain disclosed embodiments. FIG. 2c shows each of the display units 110a and 110c, IC units 112a and 112c, and the controller 114 (as shown in FIG. 1c) in a communication network.

Controller 114 and display units 110a may communicate with each other in a directional ring via IC unit 112a. Controller 114 may also communicate with display units 110c in a directional ring via IC unit 112c. Thus, controller 114 may send data and/or power signals to display units 110a and 110c in parallel via IC units 112*a* and 112*c*, respectively. Accordingly, controller 114 may send data and/or power signals to display unit 102*a* (row $1_a$, column$1_a$) and receive data and/or power signals from display unit 108*a* (row $X_a$, column $Y_a$) through IC unit 112*a*. Each display unit may receive data and/or power signals from the display unit in the previous column (e.g., a display unit at row X, column Y) and send data and/or power signals to the display unit in the next column (e.g., a display unit at row X, column Y+1). The last display unit in a row may send data and/or power signals to the first display unit in the next row by means of IC unit 112*a*. Thus, for example, display unit 104*a* in (row$1_a$, column $Y_a$) may send data and/or power signals to a display unit in row $2_a$, column $1_a$ (not shown) through IC unit 112*a*. Display unit 106*a* (row $X_a$, column $1_a$) may receive data and/or power signals from a display unit in column $Y_a$ of the previous row (not shown) through IC unit 112*a* and send data and/or power signals to a display unit in row $X_a$, column$2_a$ (not shown). Display unit 108*a* (row $X_a$, column $Y_a$) may receive data and/or power signals from a display unit in the previous column of row $X_a$ (not shown) and send data and/or power signals back to controller 114 through IC unit 112*a*.

Similarly, controller 114 may send data and/or power signals to display unit 102*c* (row$1_c$, column$1_c$) and receive data and/or power signals from display unit 108*c* (row $X_c$, column $Y_c$) through IC unit 112*c*. As discussed above, each display unit may receive data and/or power signals from the display unit in the previous column and send data and/or power signals to the display unit in the next column. The final display unit in a row may send data and/or power signals to the first display unit in the following row by means of IC unit 112*c*. Thus, for example, display unit 104*c* (row$1_c$, column$Y_c$) may send data and/or power signals to a display unit in row$2_c$ column$1_c$ (not shown) through IC unit 112*c*. Display unit 106*c* (row $X_c$, column$1_c$) may receive data and/or power signals from a display unit in column $Y_c$ of the previous row (not shown) through IC unit 112*c* and send data and/or power signals to a display unit in row $X_c$, column$2_c$ (not shown). Display unit 108*c* (row $X_c$, column $Y_c$) may receive data and/or power signals from a display unit in the previous column of row $X_c$ (not shown) and send data and/or power signals back to controller 114 through IC unit 112*c*.

In one embodiment, data and/or power signals may be transmitted from the controller 114 in parallel to each of the IC units 112*a* and 112*c*, which may send the data and/or power signals serially to display units 110*a* and 110*c*. Thus, controller 114, IC unit 112*a*, and display units 110*a* may form a first closed serial loop, and controller 114, IC unit 112*c*, and display units 110*c* may form a second closed serial loop. Alternatively and/or additionally, communication may flow in a reverse order to that described above with respect to FIG. 2*c*. That is, serial communication from controller 114 may flow through IC units 112*a* and 112*c* to display units 108*a* and 108*c*, respectively, and may flow from display units 102*a* and 102*c* through IC units 112*a* and 112*c*, respectively, to controller 114.

In an alternate embodiment, referring to FIG. 1*c*, controller 114 and each row of display units 110*a* may communicate with each other in a directional ring via IC unit 112*a*. Accordingly, controller 114 may send information to display unit 102*a* (row$1_a$, column$1_a$) and receive information from display unit 104*a* (row$1_a$, column $Y_a$) through IC unit 112*a*. Each display unit in a row may receive information from a display unit in the previous column in the same row, and send information to the display unit in the next column in the same row. The last display unit in the row may send information to controller 114 through IC unit 112*a*. Thus, for example, display unit 102*a* (row$1_a$, column$1_a$) may receive information from controller 114 by means of IC unit 112*a*, and send information to a display unit in row$1_a$, column$2_a$ (not shown). Display unit 104*a* (row$1_a$, column $Y_a$) may receive information from a display unit in the previous column of row$1_a$ (not shown), and send the information to controller 114 by means of IC unit 112*a*. Similarly, display unit 106*a* (row $X_a$, column$1_a$) may receive information from controller 114 by means of IC unit 112*a*, and send information to a display unit in the next column of row $X_a$ (not shown). Display unit 108*a* (row $X_a$, column $Y_a$) may receive information from the display unit in the previous column of row $X_a$ (not shown), and send information to controller 114 through IC unit 112*a*. Thus, in one embodiment, power and/or data may be sent serially through the network from the controller 114 to each row of display units 110*a* by means of IC unit 112*a*. Alternatively and/or additionally, communication may flow in a reverse order to that described above with respect to FIG. 1*c*. That is, serial communications from controller 114 may flow from controller 114 through IC unit 112*a* to display unit 108*a*, through each display unit from display unit 108*a* to display unit 106*a*, and from display unit 106*a* through IC unit 112*a* to controller 114. Similarly, serial communications from controller 114 may flow from controller 114 through IC unit 112*a* to display unit 104*a*, through each display unit from display unit 104*a* to display unit 102*a*, and from display unit 102*a* through IC unit 112*a* to controller 114. Thus, each row of display units 110*a* may receive data from controller 114 through IC unit 112*a* in parallel with every other row of display units 110*a*, with each row forming a closed serial loop.

Similarly, controller 114 and each row of display units 110*b* may communicate with each other in a directional ring via IC unit 112*b*. Accordingly, controller 114 may send information to display unit 102*b* (row$1_b$, column$1_b$) and receive information from display unit 104*b* (row$1_b$, column $Y_b$) through IC unit 112*b*. Each display unit in a row may receive information from a display unit in the previous column in the same row, and send information to the display unit in the next column in the same row. The last display unit in the row may send information to controller 114 through IC unit 112*b*. Thus, for example, display unit 102*b* (row$1_b$, column$1_b$) may receive information from controller 114 by means of IC unit 112*b*, and send information to a display unit in row$1_b$, column$2_b$ (not shown). Display unit 104*b* (row$1_b$, column$Y_b$) may receive information from a display unit in the previous column of row$1_b$ (not shown), and send the information to controller 114 by means of IC unit 112*b*. Similarly, display unit 106*b* (row $X_b$, column$1_b$) may receive information from controller 114 by means of IC unit 112*b*, and send information to a display unit in the next column of row $X_b$ (not shown). Display unit 108*b* (row $X_b$, column$Y_b$) may receive information from the display unit in the previous column of row $X_b$ (not shown), and send information to controller 114 through IC unit 112*b*. Thus, in one embodiment, power and/or data may be sent serially through the network from the controller 114 to each row of display units 110*b* by means of IC unit 112*b*. Alternatively and/or additionally, communication may flow in a reverse order to that described above with respect to FIG. 1*c*. That is, serial communications from controller 114 may flow from controller 114 through IC unit 112*b* to display unit 108*b*, through each display unit from display unit 108*b* to display unit 106*b*, and from display unit 106*b* through IC unit 112*b* to controller 114. Similarly, serial communications from controller 114 may flow from controller 114 through IC unit 112*b* to display unit 104*b*, through each display unit from display unit 104*b* to display unit 102*b*, and from display unit 102*b* through IC unit 112*b* to controller 114.

Thus, each row of display units 110b may receive data from controller 114 through IC unit 112b in parallel with every other row of display units 110b, with each row forming a closed serial loop.

In addition, controller 114 and each row of display units 110c may communicate with each other in a directional ring via IC unit 112c. Accordingly, controller 114 may send information to display unit 102c (row$1_c$, column$1_c$) and receive information from display unit 104c (row$1_c$, column $Y_c$) through IC unit 112c. Each display unit in a row may receive information from a display unit in the previous column in the same row, and send information to the display unit in the next column in the same row. The last display unit in the row may send information to controller 114 through IC unit 112c. Thus, for example, display unit 102c (row$1_c$, column$1_c$) may receive information from controller 114 by means of IC unit 112c, and send information to a display unit in row$1_c$, column$2_c$ (not shown). Display unit 104c (row$1_c$, column$Y_c$) may receive information from a display unit in the previous column of row $1_c$ (not shown), and send the information to controller 114 by means of IC unit 112c. Similarly, display unit 106c (row $X_c$, column$1_c$) may receive information from controller 114 by means of IC unit 112c, and send information to a display unit in the next column of row $X_c$ (not shown). Display unit 108c (row $X_c$, column $Y_c$) may receive information from the display unit in the previous column of row $X_c$ (not shown), and send information to controller 114 through IC unit 112c. Thus, in one embodiment, power and/or data may be sent serially through the network from the controller 114 to each row of display units 110c by means of IC unit 112c. Alternatively and/or additionally, communication may flow in a reverse order to that described above with respect to FIG. 1c. That is, serial communications from controller 114 may flow from controller 114 through IC unit 112c to display unit 108c, through each display unit from display unit 108c to display unit 106c, and from display unit 106c through IC unit 112c to controller 114. Similarly, serial communications from controller 114 may flow from controller 114 through IC unit 112c to display unit 104c, through each display unit from display unit 104c to display unit 102c, and from display unit 102c through IC unit 112c to controller 114. Thus, each row of display units 110c may receive data from controller 114 through IC unit 112c in parallel with every other row of display units 110c, with each row forming a closed serial loop.

Data and/or power signals may be transmitted from the controller 114 in parallel to each of IC units 112a, 112b, and 112c, which may in turn send the data and/or power signals serially to display units 110a, 110b, and 110c. Controller 114, IC unit 112a, and display units 110a may thereby form a first closed serial loop, controller 114, IC unit 112b, and display units 110b may form a second closed serial loop, and controller 114, IC unit 112c, and display units 110c may form a third closed serial loop. In addition, each row of display units 110a may form a set of closed serial loops within the first closed serial loop, each row of display units 110b may form a set of closed serial loop within the second closed serial loop, and each row of display units 110c may form a set of closed serial loop within the third closed serial loop. In such an embodiment, the number of closed serial loops in the set of closed serial loops within the first closed serial loop may correspond to the number of row of display units 110a. Similarly, the number of closed serial loops in the set of closed serial loops within the second closed serial loop may correspond to the number of row of display units 110b. Additionally, the number of closed serial loops in the set of closed serial loops within the third closed serial loop may correspond to the number of row of display units 110c. Alternatively and/or additionally, communication may flow in a reverse order to that described above with respect to FIG. 1c. Additionally, two or more rows may be combined to form a closed serial loop within any one or more of the larger closed serial loops.

Figure 2D:
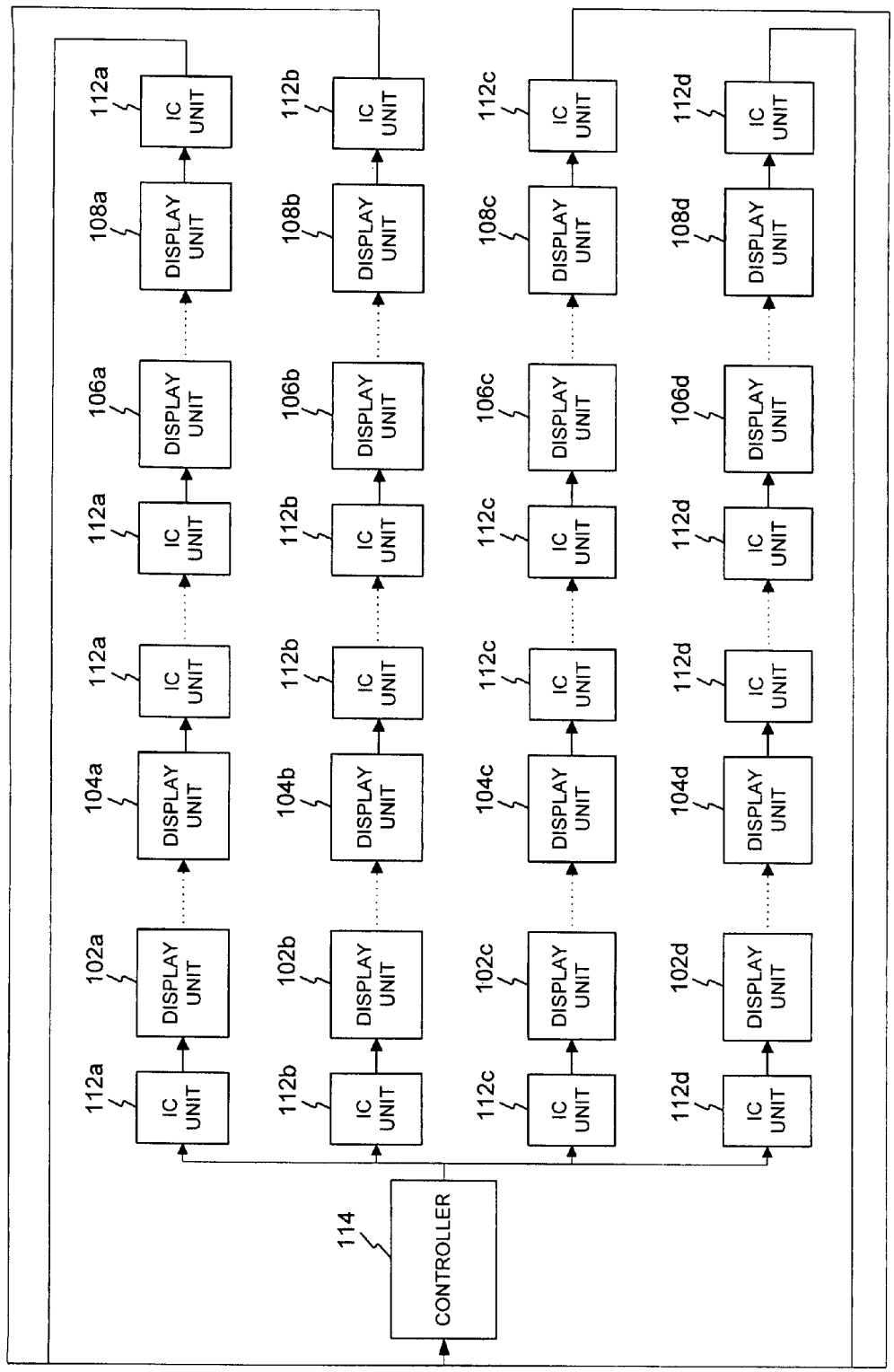
FIG. 2d shows a block diagram of an exemplary communication network for a sign display panel consistent with certain disclosed embodiments.

FIG. 2d shows a process flow diagram of an exemplary communication network for a sign display panel, consistent with certain disclosed embodiments. FIG. 2d shows each of the display units 110a, 110b, 110c, and 110d, IC units 112a, 112b, 112c, and 112d, and the controller 114 (as shown in FIG. 1d) in a communication network.

Controller 114 and display units 110a may communicate with each other in a directional ring via IC unit 112a, communicate with display units 110b in a directional ring via IC unit 112b, communicate with display units 110c in a directional ring by means of IC unit 112c, and communicate with display units 110d in a directional ring via IC unit 112d. Thus, controller 114 may transmit and/or receive data and/or power to display units 110a, 110b, 110c, and 110d in parallel by means of IC units 112a, 112b, 112c, and 112d, respectively. Accordingly, controller 114 may send data and/or power signals to display unit 102a (row$1_a$, column$1_a$) and receive data and/or power signals from display unit 108a (row $X_a$, column $Y_a$) through IC unit 112a. Each display unit may receive data and/or power signals from the display unit in the previous column (e.g., a display unit at row $X_a$, column $Y_a$) and send data and/or power signals to the display unit in the next column (e.g., a display unit at row $X_a$, column $Y_a$+1). The last display unit in a row may send data and/or power signals to the first display unit in the next row via IC unit 112a. Thus, for example, display unit 104a (row$1_a$, column $Y_a$) may send data and/or power signals to a display unit in row$2_a$, column$1_a$ (not shown) via IC unit 112a. Display unit 106a (row $X_a$, column$1_a$) may receive data and/or power signals from a display unit in column $Y_a$ of the previous row (not shown) through IC unit 112a and send data and/or power signals to a display unit in row $X_a$, column$2_a$ (not shown). Display unit 108a (row $X_a$, column $Y_a$) may receive data and/or power signals from a display unit in the previous column of row $X_a$ (not shown) and send data and/or power signals back to controller 114 via IC unit 112a.

Similarly, controller 114 may send data and/or power signals to display unit 102b (row$1_b$, column$1_b$) and receive data and/or power signals from display unit 108b (row $X_b$, column $Y_b$) through IC unit 112b. Each display unit may receive data and/or power from the display unit in the previous column (e.g., a display unit at row $X_b$, column $Y_b$) and send data and/or power to the display unit in the next column (e.g., a display unit at row $X_b$, column $Y_b$+1). The last display unit in a row may send data and/or power signals to the first display unit in the next row by means of IC unit 112b. Thus, for example, display unit 104b (row$1_b$, column $Y_b$) may send data and/or power signals to a display unit in row$2_b$, column$1_b$ (not shown) through IC unit 112b. Display unit 106b (row $X_b$, column $1_b$) may receive data and/or power signals from a display unit in column $Y_b$ of the previous row (not shown) through IC unit 112b and send data and/or power signals to a display unit in row $X_b$, column $2_b$ (not shown). Display unit 108b (row $X_b$, column $Y_b$) may receive data and/or power signals from a display unit in the previous column of row $X_b$ (not shown) and send data and/or power signals back to controller 114 through IC unit 112b.

In addition, controller 114 may send data and/or power signals to display unit 102c (row$1_c$, column$1_c$) and receive data and/or power signals from display unit 108c (row $X_c$, column $Y_c$) through IC unit 112c. Each display unit may receive data and/or power signals from the display unit in the previous column (e.g., a display unit at row $X_c$, column $Y_c$) and send data and/or power signals to the display unit in the next column (e.g., a display unit at row $X_c$, column $Y_c+1$). The last display unit in a row may send data and/or power signals to the first display unit in the next row via IC unit 112c. Thus, for example, display unit 104c (row $1_c$, column $Y_c$) may send data and/or power signals to a display unit in row $2_c$, column $1_c$ (not shown) through IC unit 112c. Display unit 106c (row $X_c$, column $1_c$) may receive data and/or power signals from a display unit in column $Y_c$ of the previous row (not shown) through IC unit 112c and send data and/or power signals to a display unit in row $X_c$, column $2_c$ (not shown). Display unit 108c (row $X_c$, column $Y_c$) may receive data and/or power signals from a display unit in the previous column of row $X_c$ (not shown) and send data and/or power signals back to controller 114 through IC unit 112c.

Further, controller 114 may send data and/or power signals to display unit 102d (row $1_d$, column $1_d$) and receive data and/or power signals from display unit 108d (row $X_d$, column $Y_d$) through IC unit 112d. As discussed above, each display unit may receive data and/or power signals from the display unit in the previous column and send data and/or power signals to the display unit in the next column. The final display unit in a row may send data and/or power signals to the first display unit in the following row via IC unit 112d. Thus, for example, display unit 104d (row1d, column $Y_d$) may send data and/or power signals to a display unit in row $2_d$, column $1_d$ (not shown) through IC unit 112d. Display unit 106d (row $X_d$, column $1d$) may receive data and/or power signals from a display unit in column $Y_d$ of the previous row (not shown) through IC unit 112d and send data and/or power signals to a display unit in row $X_d$, column $2_d$ (not shown). Display unit 108d (row $X_d$, column $Y_d$) may receive data and/or power signals from a display unit in the previous column of row $X_d$ (not shown) and send data and/or power signals back to controller 114 through IC unit 112d.

In one embodiment, data and/or power signals may be transmitted from the controller 114 in parallel to each of the IC units 112a, 112b, 112c, and 112d, which may send the data and/or power signals serially to display units 110a, 110b, 110c, and 110d, respectively. Thus, controller 114, IC unit 112a, and display units 110a may form a first closed serial loop, controller 114, IC unit 112b, display units 110b may form a second closed serial loop, controller 114, IC unit 112c, display units 110c may form a third closed serial loop, and controller 114, IC unit 112d, and display units 110d may form a fourth closed serial loop. Alternatively and/or additionally, communication may flow in a reverse order to that described above with respect to FIG. 2d. That is, serial communication from controller 114 may flow through IC units 112a, 112b, 112c, and 112d to display units 108a, 108b, 108c, and 108d, respectively, and may flow from display units 102a, 102b, 102c, and 102d through IC units 112a, 112b, 112c, and 112d, respectively, to controller 114.

In an alternate embodiment, referring to FIG. 1d, controller 114 and each row of display units 110a may communicate with each other in a directional ring via IC unit 112a. Accordingly, controller 114 may send information to display unit 102a (row $1_a$, column $1_a$) and receive information from display unit 104a (row $1_a$, column $Y_a$) through IC unit 112a. Each display unit in a row may receive information from a display unit in the previous column in the same row, and send information to the display unit in the next column in the same row. The last display unit in the row may send information to controller 114 through IC unit 112a. Thus, for example, display unit 102a (row $1_a$, column $1_a$) may receive information from controller 114 by means of IC unit 112a, and send information to a display unit in row $1_a$, column $2_a$ (not shown). Display unit 104a (row $1_a$, column $Y_a$) may receive information from a display unit in the previous column of row $1_a$ (not shown), and send the information to controller 114 by means of IC unit 112a. Similarly, display unit 106a (row $X_a$, column $1_a$) may receive information from controller 114 by means of IC unit 112a, and send information to a display unit in the next column of row $X_a$ (not shown). Display unit 108a (row $X_a$, column $Y_a$) may receive information from the display unit in the previous column of row $X_a$ (not shown), and send information to controller 114 through IC unit 112a. Thus, in one embodiment, power and/or data may be sent serially through the network from the controller 114 to each row of display units 110a by means of IC unit 112a. Alternatively and/or additionally, communication may flow in a reverse order to that described above with respect to FIG. 1d. That is, serial communications from controller 114 may flow from controller 114 through IC unit 112a to display unit 108a, through each display unit from display unit 108a to display unit 106a, and from display unit 106a through IC unit 112a to controller 114. Similarly, serial communications from controller 114 may flow from controller 114 through IC unit 112a to display unit 104a, through each display unit from display unit 104a to display unit 102a, and from display unit 102a through IC unit 112a to controller 114. Thus, each row of display units 110a may receive data from controller 114 through IC unit 112a in parallel with every other row of display units 110a, with each row forming a closed serial loop.

Similarly, controller 114 and each row of display units 110b may communicate with each other in a directional ring via IC unit 112b. Accordingly, controller 114 may send information to display unit 102b (row $1_b$, column $1_b$) and receive information from display unit 104b (row $1_b$, column $Y_b$) through IC unit 112b. Each display unit in a row may receive information from a display unit in the previous column in the same row, and send information to the display unit in the next column in the same row. The last display unit in the row may send information to controller 114 through IC unit 112b. Thus, for example, display unit 102b (row $1_b$, column $1_b$) may receive information from controller 114 by means of IC unit 112b, and send information to a display unit in row $1_b$, column $2_b$ (not shown). Display unit 104b (row $1_b$, column $Y_b$) may receive information from a display unit in the previous column of row $1_b$ (not shown), and send the information to controller 114 by means of IC unit 112b. Similarly, display unit 106b (row $X_b$, column $1_b$) may receive information from controller 114 by means of IC unit 112b, and send information to a display unit in the next column of row $X_b$ (not shown). Display unit 108b (row $X_b$, column $Y_b$) may receive information from the display unit in the previous column of row $X_b$ (not shown), and send information to controller 114 through IC unit 112b. Thus, in one embodiment, power and/or data may be sent serially through the network from the controller 114 to each row of display units 110b by means of IC unit 112b. Alternatively and/or additionally, communication may flow in a reverse order to that described above with respect to FIG. 1d. That is, serial communications from controller 114 may flow from controller 114 through IC unit 112b to display unit 108b, through each display unit from display unit 108b to display unit 106b, and from display unit 106b through IC unit 112b to controller 114. Similarly, serial communications from controller 114 may flow from controller 114 through IC unit 112b to display unit 104b, through each display unit from display unit 104b to display unit 102b, and from display unit 102b through IC unit 112b to controller 114.

Thus, each row of display units 110b may receive data from controller 114 through IC unit 112b in parallel with every other row of display units 110b, with each row forming a closed serial loop.

In addition, controller 114 and each row of display units 110c may communicate with each other in a directional ring via IC unit 112c. Accordingly, controller 114 may send information to display unit 102c (row1$_c$, column1$_c$) and receive information from display unit 104c (row1$_c$, column Y$_c$) through IC unit 112c. Each display unit in a row may receive information from a display unit in the previous column in the same row, and send information to the display unit in the next column in the same row. The last display unit in the row may send information to controller 114 through IC unit 112c. Thus, for example, display unit 102c (row1$_c$, column1$_c$) may receive information from controller 114 by means of IC unit 112c, and send information to a display unit in row1$_c$, column2$_c$ (not shown). Display unit 104c (row1$_c$, column Y$_c$) may receive information from a display unit in the previous column of row1$_c$ (not shown), and send the information to controller 114 by means of IC unit 112c. Similarly, display unit 106c (row X$_c$, column1$_c$) may receive information from controller 114 by means of IC unit 112c, and send information to a display unit in the next column of row X$_c$ (not shown). Display unit 108c (row X$_c$, column Y$_c$) may receive information from the display unit in the previous column of row X$_c$ (not shown), and send information to controller 114 through IC unit 112c. Thus, in one embodiment, power and/or data may be sent serially through the network from the controller 114 to each row of display units 110c by means of IC unit 112c. Alternatively and/or additionally, communication may flow in a reverse order to that described above with respect to FIG. 1d. That is, serial communications from controller 114 may flow from controller 114 through IC unit 112c to display unit 108c, through each display unit from display unit 108c to display unit 106c, and from display unit 106c through IC unit 112c to controller 114. Similarly, serial communications from controller 114 may flow from controller 114 through IC unit 112c to display unit 104c, through each display unit from display unit 104c to display unit 102c, and from display unit 102c through IC unit 112c to controller 114. Thus, each row of display units 110c may receive data from controller 114 through IC unit 112c in parallel with every other row of display units 110c, with each row forming a closed serial loop.

Further, controller 114 and each row of display units 110d may communicate with each other in a directional ring via IC unit 112d. Accordingly, controller 114 may send information to display unit 102d (row1d, column1d) and receive information from display unit 104d (row1$_d$, column Y$_d$) through IC unit 112d. Each display unit in a row may receive information from a display unit in the previous column in the same row, and send information to the display unit in the next column in the same row. The last display unit in the row may send information to controller 114 through IC unit 112d. Thus, for example, display unit 102d (row1$_d$, column1$_d$) may receive information from controller 114 by means of IC unit 112d, and send information to a display unit in row1d, column2$_d$ (not shown). Display unit 104d (row1d, column Y$_d$) may receive information from a display unit in the previous column of row1d (not shown), and send the information to controller 114 by means of IC unit 112d. Similarly, display unit 106d (row X$_d$, column1$_d$) may receive information from controller 114 by means of IC unit 112d, and send information to a display unit in the next column of row X$_d$ (not shown). Display unit 108d (row X$_d$, column Y$_d$) may receive information from the display unit in the previous column of row X$_d$ (not shown), and send information to controller 114 through IC unit 112d. Thus, in one embodiment, power and/or data may be sent serially through the network from the controller 114 to each row of display units 110d by means of IC unit 112d. Alternatively and/or additionally, communication may flow in a reverse order to that described above with respect to FIG. 1d. That is, serial communications from controller 114 may flow from controller 114 through IC unit 112d to display unit 108d, through each display unit from display unit 108d to display unit 106d, and from display unit 106d through IC unit 112d to controller 114. Similarly, serial communications from controller 114 may flow from controller 114 through IC unit 112d to display unit 104d, through each display unit from display unit 104d to display unit 102d, and from display unit 102d through IC unit 112d to controller 114. Thus, each row of display units 110d may receive data from controller 114 through IC unit 112d in parallel with every other row of display units 110d, with each row forming a closed serial loop.

Data and/or power signals may be transmitted from the controller 114 in parallel to each of IC units 112a, 112b, 112c, and 112d, which may in turn send the data and/or power signals serially to display units 110a, 110b, 110c, and 110d. Controller 114, IC unit 112a, and display units 110a may thereby form a first closed serial loop, controller 114, IC unit 112b, and display units 110b may form a second closed serial loop, controller 114, IC unit 112c, and display units 110c may form a third closed serial loop, and controller 114, IC unit 112d, and display units 110d may form a fourth closed serial loop. In addition, each row of display units 110a may form a set of closed serial loops within the first closed serial loop, each row of display units 110b may form a set of closed serial loop within the second closed serial loop, each row of display units 110c may form a set of closed serial loop within the third closed serial loop, and each row of display units 110d may form a set of closed serial loop within the fourth closed serial loop. In such an embodiment, the number of closed serial loops in the set of closed serial loops within the first closed serial loop may correspond to the number of row of display units 110a. Similarly, the number of closed serial loops in the set of closed serial loops within the second closed serial loop may correspond to the number of row of display units 110b. Additionally, the number of closed serial loops in the set of closed serial loops within the third closed serial loop may correspond to the number of row of display units 110c. Further, the number of closed serial loops in the set of closed serial loops within the fourth closed serial loop may correspond to the number of row of display units 110d. Alternatively and/or additionally, communication may flow in a reverse order to that described above with respect to FIG. 1d. Additionally, two or more rows may be combined to form a closed serial loop within any one or more of the larger closed serial loops.

Figure 3:
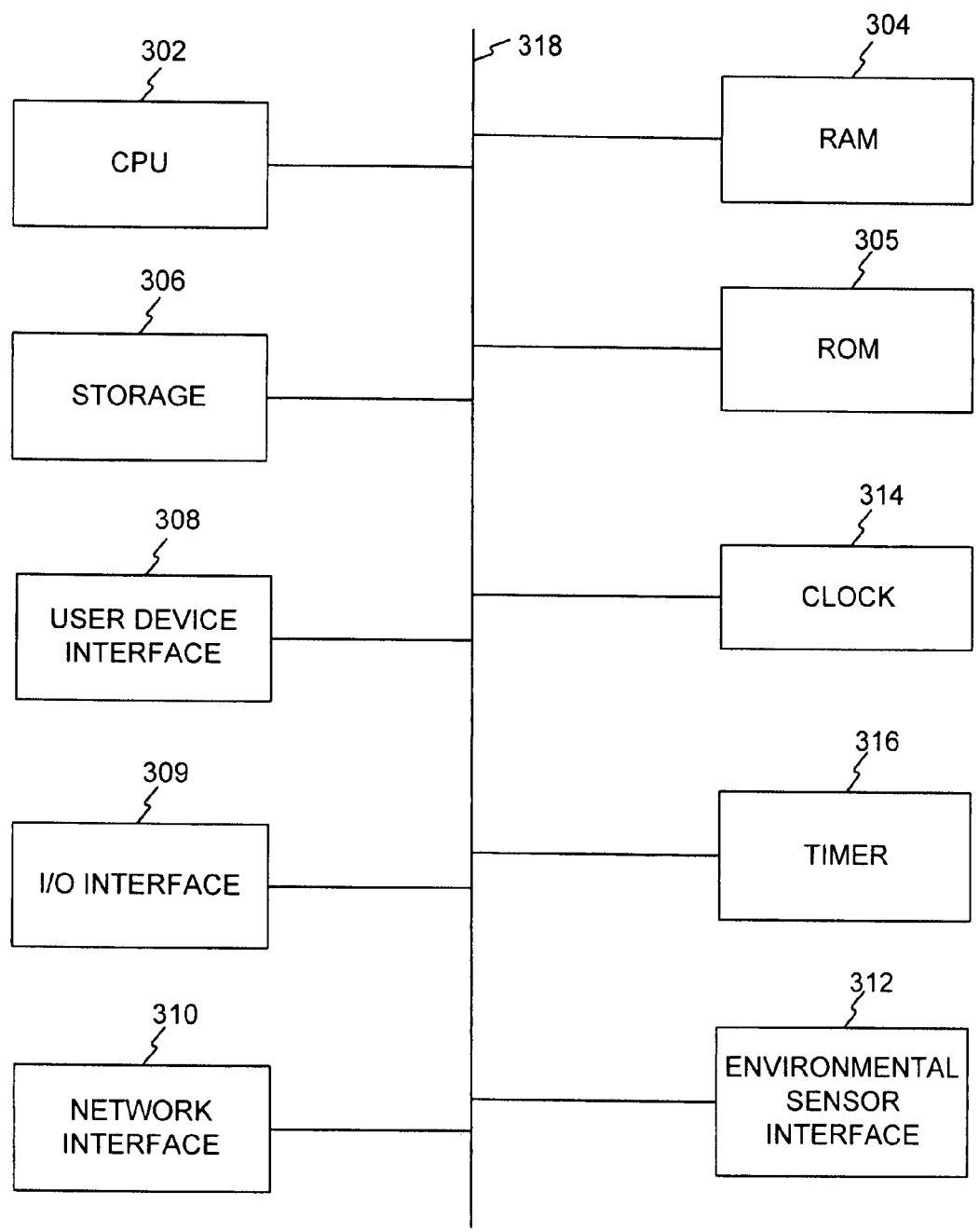
FIG. 3 shows a block diagram of an exemplary controller consistent with certain disclosed embodiments.

Referring to FIG. 3, a block diagram of an exemplary controller 114, consistent with certain disclosed embodiments, is shown. Controller 114 may be a computing system configured to receive, send, report, display, and distribute data and/or power signals related to sign display panels. For example, controller 114 may include one or more of a central processing unit (CPU) 302, a random access memory (RAM) 304, a read-only memory (ROM) 305, memory 306, user device interface 308, I/O interface 309, network interface 310, environmental sensor interface 312, clock 314, and timer 316. In one embodiment, CPU 302, RAM 304, and ROM 305 may be combined in a single integrated circuit such as a microcontroller. Controller 114 may be a server, client, mainframe, desktop, laptop, network computer, workstation, personal digital assistant (PDA), tablet PC, scanner, telephony device, pager, and the like. In addition, one or more constituent components of controller 114 may be located remotely from display units 110 and IC unit 112.

CPU 302 may include one or more processors, each configured to execute instructions and process data to perform functions associated with sign display panels and sign display panel messages. As illustrated in FIG. 3, CPU 302 may be in communication with RAM 304, ROM 305, memory 306, user interface 308, I/O interface 309, network interface 310, environmental sensor interface 312, clock 314, and timer 316. CPU 302 may communicate with one or more other subsystems of controller 114 over a high speed interconnect or bus 318. CPU 302 may be configured to execute computer program instructions to perform various processes and methods consistent with certain disclosed embodiments. In one exemplary embodiment, computer program instructions may be loaded into RAM 304 by means of bus 318 for execution by CPU 302.

RAM 304 and ROM 305 may each include one or more devices for storing information associated with operation of controller 114, IC unit 112, display units 110, and/or CPU 302. For example, ROM 305 may include a memory device configured to access and store information associated with controller 114, including information for identifying, initializing, and monitoring the operation of one or more components and subsystems of controller 114. ROM 305 may include a memory device for storing data associated with one or more operations of CPU 302. For example, instructions stored on ROM 305 may be loaded into RAM 304 for execution by CPU 302. RAM 305, in one embodiment, may be a standard first-in-first-out (FIFO) memory.

Memory 306 may include any type of storage device configured to store any type of information used by CPU 302 to perform one or more processes consistent with the disclosed embodiments. Memory 306 may include, for example, one or more magnetic and/or optical disk devices such as hard drives, CD-ROMs, DVD-ROMs, a universal serial bus (USB) port, a floppy, or any other type of mass media device.

User device interface 308 may be one or more interfaces for coupling controller 114 with one or more user devices such as a keyboard, a mouse, a display device, and any other device useful in operating and managing controller 114. For example, a user device may include a console with an integrated keyboard and mouse to allow a user to input parameters associated with sign display panels and sign display panel messages. User devices may also include one or more displays or other peripheral devices, such as, for example, printers, cameras, microphones, speaker systems, electronic tablets, bar code readers, scanners, or any other suitable type of user interface device.

I/O interface 309 may be one or more interfaces for coupling controller 114 with one or more IC units 112 and one or more display units 110. For example, in one exemplary embodiment, referring to FIG. 1d, a first I/O interface 309 may be configured to couple controller 114 with a first IC unit (e.g., IC unit 112a) and first set of one or more display units (e.g., display units 110a), a second I/O interface 309 may be configured to couple controller 114 with a second IC unit (e.g., IC unit 112b) and second set of one or more display units (e.g., display units 110b), a third I/O interface 309 may be configured to couple controller 114 with a third IC unit (e.g., IC unit 112c) and third set of one or more display units (e.g., display units 110c), and a fourth I/O interface 309 may be configured to couple controller 114 with a fourth IC unit (e.g., IC unit 112d) and fourth set of one or more display units (e.g., display units 110d).

Network interface 310 may include one or more components configured to transmit and/or receive data via one or more networks, such as, for example, one or more modulators, demodulators, multiplexers, de-multiplexers, network communication devices, wireless devices, antennas, modems, and any other type of device configured to enable data communication via any suitable communication network. Network interface 310 may also be configured to provide remote connectivity between CPU 302, RAM 304, ROM 305, memory 306, user interface 308, I/O interface 309, network interface 310, environmental sensor interface 312, clock 314, and timer 316 to perform the methods of the disclosed embodiments. The one or more networks may be any appropriate network allowing communication between or among one or more computing systems, such as, for example, the Internet, a local area network (e.g. LAN, WAN, WiFi, etc.), a wide area network (e.g., WAN, etc.), a metropolitan area network (e.g., MAN, WiMax, WiMan, etc.), a workstation peer-to-peer network, a direct link network, telephony network, cellular network, or any other suitable communication network. Connection with one or more networks may be wired, wireless, or any combination thereof. In one exemplary embodiment, the one or more networks may allow communication between controller 114 and one or more remotely located users. Users may include, for example, one or more of the manufacturer, owner, operator, repair company and/or personnel, leaser/lessee, regulatory body and/or personnel, highway personnel, etc.

Environmental sensor interface 312 may be one or more interfaces allowing controller 114 to communicate with one or more environmental sensors (not shown). An environmental sensor may detect environmental data, such as, for example, temperature, light (ambient or direct), wind speed, etc. In one exemplary embodiment, the sign display panel and/or sign display panel message may be adjusted or modified based on the detected environmental data. For example, controller 114 may adjust various display parameters of the display according to data received through the environmental sensors interface 312 from one or more environmental sensors. In one example, if an environmental sensor detects a level of direct light exceeding a predetermined threshold (e.g., if the amount of direct light renders the display panel difficult to read based on a predetermined set of criteria, etc.), controller 114 may be configured to generate an error message, log the error message, and/or notify a user, as is discussed in greater detail below. Alternatively and/or additionally, controller 114 may be configured to reconfigure the sign display panel message to accommodate one or more regions of the sign display panel that may be unreadable. Further, controller 114 may be configured to adjust display parameters associated with one or more display units. Display parameters may include, for example, lightness, brightness, contrast, color, etc.

Controller 114 may include additional, fewer, and/or different components than those listed above and it is understood that the listed components are exemplary only and not intended to be limiting. For example, controller 114 may include one or more display outputs, such as, for example, light emitting diode (LED) display, liquid crystal display (LCD), organic light emitting diode (OLED), plasma display, digital light processing (DLP) display, cathode ray tube (CRT), and the like, as well as one or more associated output device interfaces. As another example, one or more of the hardware components listed above may be implemented using software. In one exemplary embodiment, memory 306 may include a software partition associated with one or more other hardware components of controller 114. Additional hardware or software may also be used to operate controller 114, such as, for example, security applications, authentication systems, dedicated communication systems, etc. The hardware and/or software may be interconnected and accessed as required by authorized users. In addition, a portion, or all of, controller 114 may be hosted and/or operated offsite using, for example, commercial servers, commercial application providers, and the like. In one exemplary embodiment, timer 312 may be implemented as a microcontroller supervisory circuit, and clock 310 may be implemented as a crystal oscillator or ceramic resonator.

Figure 4A:
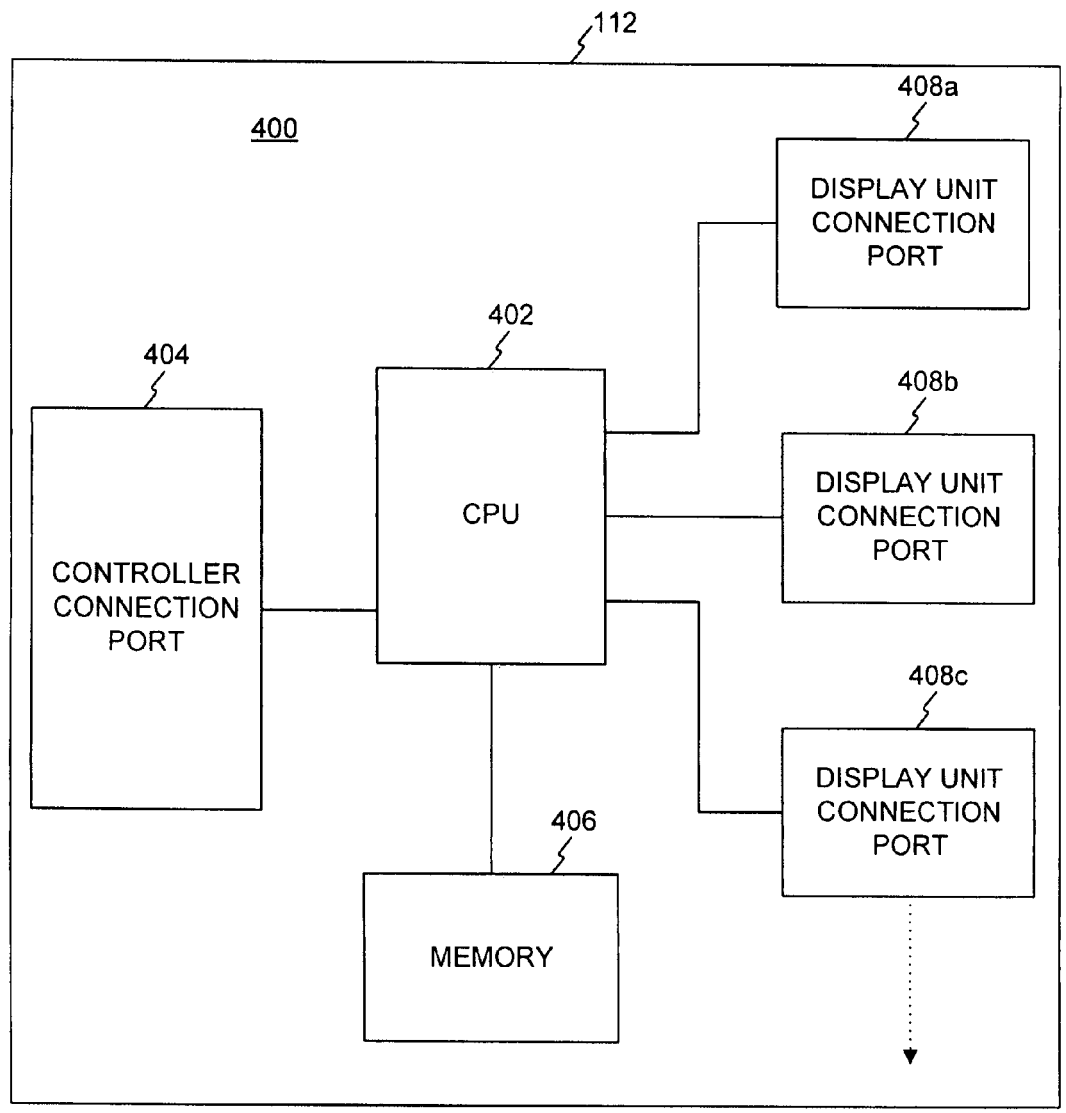
FIG. 4a shows a block diagram of an exemplary interconnect (IC) unit consistent with certain disclosed embodiments.

FIG. 4a shows one exemplary embodiment of IC unit 112 in greater detail. IC unit 112 may include a printed circuit board 400 that includes controller connection port 404 for receiving power and data from controller 114, and for sending data to controller 114. Circuit board 400 may also include central processing unit (CPU) 402, memory 406, and one or more display unit connection ports 408a-408c. In one embodiment, CPU 402 and memory 406 may be combined in a single integrated circuit such as a microcontroller.

CPU 402 may include one or more processors, each configured to execute instructions and process data to perform various processes and methods consistent with certain disclosed embodiments. For example, CPU 402 may receive, compile, process, and distribute data received from one or more display units 110 and/or controller 114, such as, for example, message data, error data, failure data, environmental data, frame data, display data, etc. As illustrated in FIG. 4, CPU 402 may be in communication with controller connection port 404, memory 406, and one or more display unit connection ports 408a-408c.

Memory 406 may include any type of storage device configured to store any type of information used by CPU 402 to perform one or more processes or functions consistent with certain disclosed embodiments. Memory 406 may include, for example, one or more magnetic and/or optical disk devices such as hard drives, CD-ROMs, DVD-ROMs, a universal serial bus (USB) port, a floppy, or any other type of mass media device.

Each of the one or more display unit connection ports 408a-408c may provide power to a corresponding row of display units, provide data to a display unit, and receive data from a display unit. In one exemplary embodiment, connection port 408 may provide data to a display unit in the first column of a given row and receive data from a display unit in the last column of the corresponding row. For example, display unit connection port 408a may be connected to row1, and may provide power to the display units of row1, provide data to the display unit in the first column of the row (e.g., display unit 102 of FIG. 1a), and receive data from the display unit in the last column of the row (e.g., display unit 104 of FIG. 1a). Display unit connection port 408b may be connected to row2, and may provide power to the display units of row1, provide data to the display unit in the first column of the row (e.g., the display unit at row2, column1), and receive data from the display unit in the last column of the row (e.g., the display unit at row2, columnY). Display unit connection port 408c may be connected to row3, and may provide power to the display units of row1, provide data to the display unit in the first column of the row (e.g., the display unit at row3, column1), and receive data from the display unit in the last column of the row (e.g., the display unit at row3, columnY). This configuration may repeated for all rows connected to IC unit 112. In this embodiment, each row of display units 110 may function as a closed serial loop. Each row connected to IC unit 112 may also operate as a closed serial loop within a larger closed serial loop including controller 114, IC unit 112, and all display units connected to IC unit 112. IC unit 112 may implement any number of display unit connection ports 408. Each row of display units may be connected to a corresponding display unit connection port 408 through a connector (not shown), which may be any suitable means for transmitting power and/or digital data such as cable, copper wire, fiber optic lines, wireless network, etc. An example of such a connector is Molex Compodre. In addition, each display unit connection port 408 may include a sensor for detecting the presence of a connector.

IC unit 112 may include additional, fewer, and/or different components than those listed above and it is understood that the listed components are exemplary only and not intended to be limiting. For example, one or more of the hardware components listed above may be implemented using software. In one exemplary embodiment, memory 406 may include a software partition associated with one or more other hardware components of IC unit 112. IC unit 112 may include additional hardware or software, such as, for example, security applications, authentication systems, dedicated communication systems, etc. In one exemplary embodiment, IC unit 112 may include a timer and clock. The timer may be implemented as a microcontroller supervisory circuit, and the clock may be implemented as a crystal oscillator or ceramic resonator.

Figure 4C:
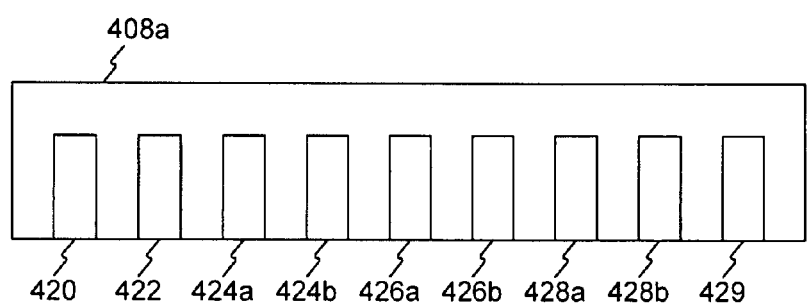
FIG. 4c shows a block diagram of an exemplary display unit connection port consistent with certain disclosed embodiments.
Figure 4B:
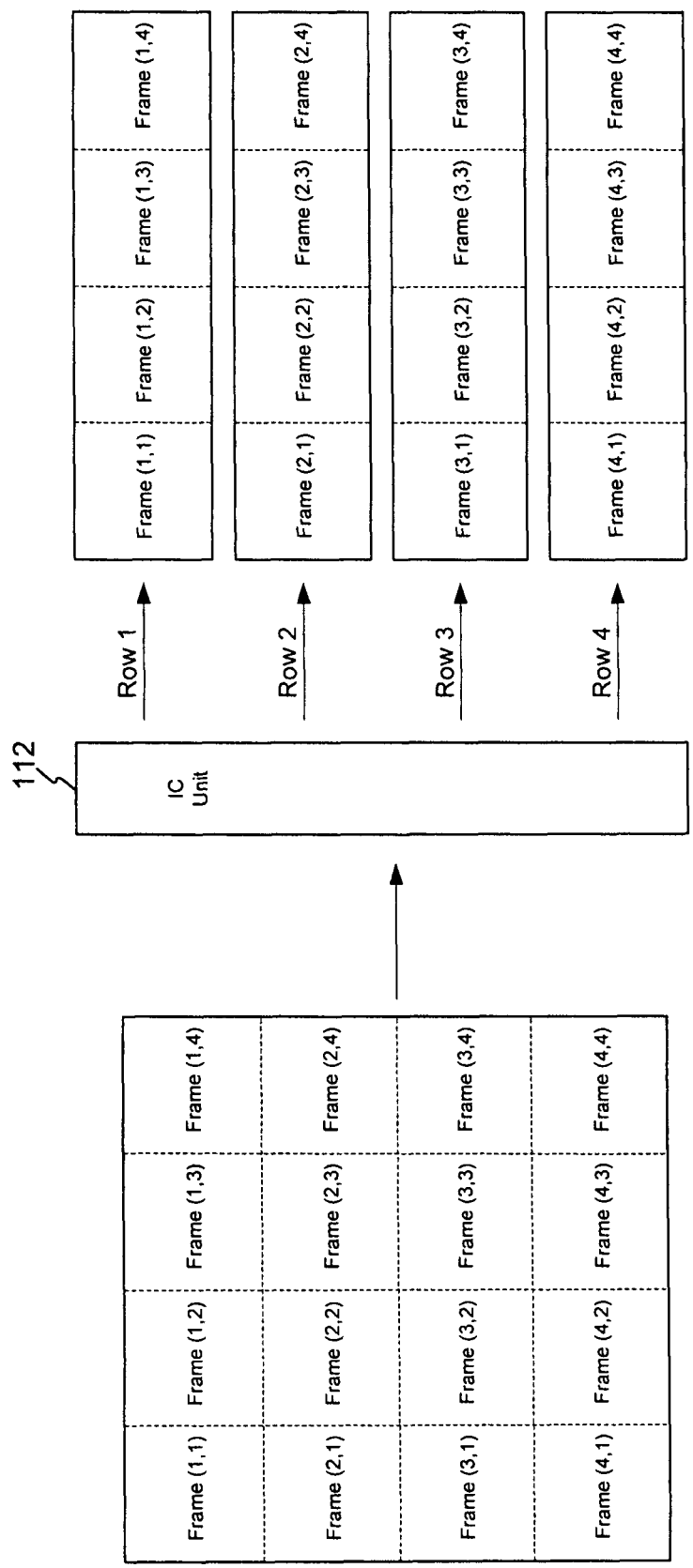
FIG. 4b shows a flow diagram of an exemplary method for providing display data consistent with certain disclosed embodiments.

FIG. 4b shows a block diagram of a exemplary process for transmitting display data through IC unit 112, consistent with certain disclosed embodiments. Controller 114 may send one or more frames of display data to IC unit 112. IC unit 112 may, in turn, send the one or more frames of display data to the row in which the one or more frames of display data will be displayed. In one exemplary embodiment, IC unit 112 may break apart the data, sending only a portion of the data received from controller 114 to each row of display units 110. For example, one or more frames of display data for display in row1(e.g., Frame (1,1), Frame (1,2), Frame (1,3) and Frame (1,4)) may only be sent to row1, one or more frames of display data for display in row2(e.g., Frame (2,1), Frame (2,2), Frame (2,3) and Frame (2,4) may only be sent to row2, one or more frames of display data for display in row3(e.g., Frame (3,1), Frame (3,2), Frame (3,3) and Frame (3,4)) may only be sent to row3, and one or more frames of display data for display in row4(e.g., Frame (4,1), Frame (4,2), Frame (4,3) and Frame (4,4)) may only be sent to row4.

IC unit 112 may be configured to bypass one or more rows if a failure or other error condition is detected in a row. That is, if a failure is detected in a row, IC unit 112 may disable the row of display units and may thereby maintain the closed serial loop. Disabling a row may include, for example, shutting down the display units in the row, electrically bypassing the row, placing the display units in the row into a hibernation mode, etc. Bypassing a row may be achieved through any hardware or software means. For example, IC unit 112 may contain software that, when an error is detected in a row, routes the data from the row immediately preceding the row in which an error is detected to the row immediately following. Similarly, one or more hardware devices may be used to bypass the desired row such as, for example, switches (not shown) and the like. For example, if a failure is detected in row1, IC unit 112 may bypass row1, sending signals only to row2 through row X. Similarly, if a failure is detected in row2, IC unit 112 may continue sending data and power signals to row1 and rows3 through X. In one exemplary embodiment, if IC unit 112 has bypassed one or more rows, IC unit 112 may then shift one or more frames of data accordingly. For example, if IC unit 112 has bypassed row1, one or more frames of display data for display in row1(e.g., Frame (1,1), Frame (1,2), Frame (1,3) and Frame (1,4)) may instead be sent to row2, one or more frames of display data for display in row2(e.g., Frame (2,1), Frame (2,2), Frame (2,3) and Frame (2,4) may instead be sent to row3, one or more frames of display data for display in row3(e.g., Frame (3,1), Frame (3,2), Frame (3,3) and Frame (3,4)) may instead be sent to row4, and one or more frames of display data for display in row4(e.g., Frame (4,1), Frame (4,2), Frame (4,3) and Frame (4,4)) may instead be sent to row5. Similarly, IC unit 112 may receive message data from controller 114, and may send the message data in parallel to each row connected to IC unit 112.

FIG. 4c shows a block diagram of an exemplary display unit connection port 408a-408c, consistent with certain disclosed embodiments. In this embodiment, a display unit connection port (e.g. port 408a-408c) may comprise two pins 420 and 422 for distributing power to the row of display units, two pins 424a and 424b for sending data to the display unit in the first column, two pins 426a and 426b for receiving data from the display unit in the last column, two pins 428a and 428b for closing a switch to indicate the presence of a connector (not shown) that connects display unit connection port 304a to a row of display units, and one pin 429 for system reset. The system reset pin 429 may provide a means for the controller to issue a restart command to each display unit in the row of display units independent of the communication network. In this embodiment, the two pins 428a and 428b, which close the switch, may act as the sensor for the display unit connection port 408a. Alternative sensors, such as a pressure sensor, may be used as is understood by one of skill in the art. In one exemplary embodiment, data lines may be doubled. That is, for each data line, at leas one redundant data line may also be used. The configuration of display unit connection port 408 is not intended to be limiting. Other pins, number of pins, etc. can be implemented.

In one embodiment, CPU 402 may execute instructions associated with interconnect software stored in memory 406. The interconnect software may include instructions for polling each of the display unit connection ports 408 to determine the presence of a connector at any of the display unit connection ports 408. For example, if pins 428a and 428b of display unit connection port 408a have closed a switch (not shown), the interconnect software may recognize that a connector has been connected to display unit connection port 408a. The interconnect software may send the results to controller 114 through controller connection port 402. The interconnect software may also determine the total number of display units and, therefore, the configuration of the sign display panel.

Figure 5:
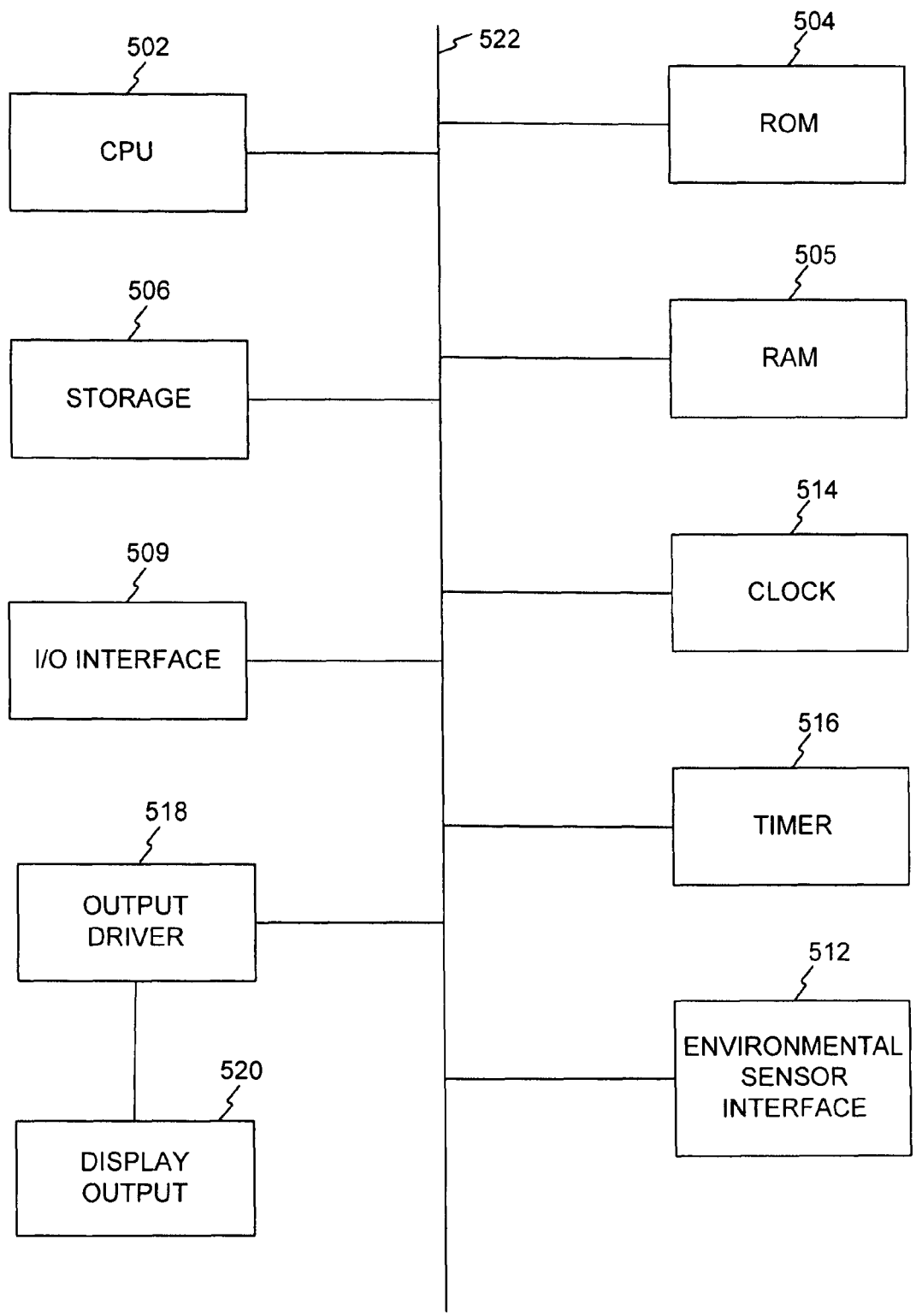
FIG. 5 shows a block diagram of an exemplary display unit for use in a display panel consistent with certain disclosed embodiments.

FIG. 5 shows a block diagram of an exemplary display unit for use in a sign display panel 100, consistent with certain disclosed embodiments. The display unit may be any type of display unit having a computing system configured to receive, send, report, display, and distribute data related to sign display panels and sign display panel messages. The display unit may include one or more of a central processing unit (CPU) 502, random access memory (RAM) 504, read-only memory (ROM) 505, memory 506, I/O interface 509, environmental sensor interface 512, clock 514, timer 516, output driver 518, and display output 520. CPU 502, RAM 504, and ROM 505 may be combined in a single integrated circuit such as, for example, a microcontroller. In one embodiment, CPU 502, RAM 504, and ROM 505 may be an Atmel AVR Microcontroller.

CPU 502 may include one or more processors, each configured to execute instructions and process data to perform functions associated with sign display panels and sign display panel messages. As illustrated in FIG. 5, CPU 502 may be in communication with RAM 504, ROM 505, memory 506, I/O interface 509, environmental sensor interface 512, clock 514, timer 516, output driver 518, and display output 520 by means of a high speed interconnect or bus 522. In one exemplary embodiment, computer program instructions may be loaded into RAM 504 by means of bus 522 for execution by CPU 502.

RAM 504 and ROM 505 may each include one or more devices for storing information associated with operation of the display unit and/or CPU 502. For example, ROM 505 may include a memory device configured to access and store information associated with the display unit, including information for identifying, initializing, and monitoring the operation of one or more components and/or subsystems of the display unit. ROM 505 may include a memory device for storing data associated with one or more operations of CPU 502. For example, instructions stored on ROM 505 may be loaded into RAM 504 for execution by CPU 502. In addition, RAM 504 may store one or more frames of display data received from controller 114 through I/O interface 509. For example, when CPU 502 receives an instruction to refresh the display, CPU 502 may process a frame of display data stored in RAM 504 and send the frame of display data to output drivers 518, which may refresh display output device 520. RAM 504, in one embodiment, may be a standard first-in-first-out (FIFO) memory.

Memory 506 may include any type of storage device configured to store any type of information used by the display unit to perform one or more processes consistent with certain disclosed embodiments. Memory 506 may include, for example, one or more magnetic and/or optical disk devices such as hard drives, CD-ROMs, DVD-ROMs, a universal serial bus (USB) port, a floppy, or any other type of mass media device. In one embodiment, memory 506 may be configured to store one or more frames of display data for display by the display unit.

I/O interface 509 may be one or more interfaces for connecting a display unit with IC unit 112 and/or one or more other display units, as is understood by one of skill in the art. In one exemplary embodiment, I/O interface 509 may be implemented as one or more RS232C Transceivers.

Environmental sensor interface 512 may be one or more interfaces for allowing the display unit to communicate with one or more environmental sensors (not shown). An environmental sensor may detect environmental data, such as, for example, temperature, light (ambient or direct), wind speed, etc. In one exemplary embodiment, the sign display panel and/or sign display panel message may be adjusted or modified based on the detected environmental data. In one example, if an environmental sensor detects a level of direct light exceeding a predetermined threshold (e.g., if the amount of direct light renders the display panel difficult to read based on a predetermined set of criteria, etc.), CPU 506 may be configured to generate an error message, log the error message, and/or notify a user, as is discussed in greater detail below. Alternatively and/or additionally, CPU 506 may be configured to reconfigure the sign display panel message to accommodate one or more regions of the sign display panel that may be unreadable. Further, CPU 506 may be configured to adjust display parameters associated with one or more display units. Display parameters may include, for example, lightness, brightness, contrast, color, etc.

Output drivers 518 may be one or more devices configured to interface with display output device 520 and cause display output 520 to process and display data. Output drivers 518 may contain routines, macros, and services to execute display requests, copy data between one or more memory devices (e.g., RAM 504, ROM 505, memory 506, etc.) and display output device memory contained on display output 520, and the like. For example, output drivers 518 may operate to cause one or more other devices to manage output functions of a graphic unit and/or display hardware. Output drivers 518 may be, in one exemplary embodiment, a series of switches and may control display output 520. In addition, more complex output drivers 518 may be used to control a more sophisticated display output 520, as is understood by those of skill in the art.

Display output 520 may include one or more display outputs, such as, for example, light emitting diode (LED) display, liquid crystal display (LCD), organic light emitting diode (OLED), plasma display, digital light processing (DLP) display, cathode ray tube (CRT), and the like. Each display output 520 may include a plurality of display picture elements (e.g., pixels, LEDs, phosphor triads, etc.).

The display unit 102 may also include a timer 512 and clock 510. In one exemplary embodiment, timer 512 may be implemented as a microcontroller supervisory circuit, and clock 510 may be implemented as a crystal oscillator or ceramic resonator. In addition, the display unit can have additional memory and/or logic for storing information for identification to controller 114. For example, the display unit may be configured to send identifying information to IC unit 112 and/or controller 114. Identifying information may include, for example, manufacturer, make, model, year of manufacturer, and the like. From this identifying information, controller 114 and/or IC unit 112 may determine the number of pixels (e.g., pixels, etc.) in a row, the number of picture elements in a column, the spacing between picture elements, etc. Using this information, controller 114 and/or IC unit 112 may configure and/or reconfigure the sign display panel and/or the sign display panel message.

The display unit may include additional, fewer, and/or different components than those listed above and it is understood that the listed components are exemplary only and not intended to be limiting. For example, one or more of the hardware components listed above may be implemented using software. As another example, memory 506 may include a software partition associated with one or more other hardware components of the display unit. In another exemplary embodiment, the display unit can have additional memory and/or logic for storing a unique address for identification to controller 114. Additional hardware or software may also be used to operate the display unit, such as, for example, security applications, authentication systems, dedicated communication systems, etc.

Further, each display unit may have one or more software and/or hardware components configured to perform diagnostic operations on the display unit. For example, the display unit may be able to diagnostically determine if one or more pixels have failed or have an intensity level lower than a predetermined threshold (e.g., a pixel intensity is less than 50% of maximum intensity), etc. If one or more diagnostic operations are unsuccessful or indicate an error, the display unit may send an error message to IC unit 112 and/or controller 114. The error message may contain information associated with the diagnostic operation and/or failure.

In addition, in one exemplary embodiment, each display unit 102 may be identical to every other display unit 102 in sign display panel 100. Thus, display units 102 may be interchangeable and capable of being added and/or removed without any position-specific information or identification. For example, one display unit 102 in a closed serial network may be used to replace any other display unit 102.

In certain disclosed embodiments, three types of messages may be transmitted in the closed serial communication network: global messages, local messages, and communication integrity messages. Messages may be sent by controller 114 to IC unit 112 which may be connected to display units 110. IC unit 112 may transmit messages received from controller 114 to each row of display units by means of display unit connectors 408.

Communication of messages may flow either a forward or in a reverse direction. For example, in the forward direction, IC unit 112 may transmit one or more messages received from controller 114 to display unit 102 of FIG. 1*a* and may receive messages from display unit 108, which may then be sent to controller 114. In the reverse flow, IC unit 112 may transmit one or more messages received from controller 114 to display unit 108 of FIG. 1*a* and may receive messages from display unit 102, which may then be sent to controller 114. Further, if IC unit 112 bypasses one or more rows, as discussed above, communication may flow from controller 114 to the first display unit in the first active row. For example, referring to FIG. 1*a*, if row1 is bypassed, messages may flow from controller 114 to the display unit at row2, column1(not shown) by means of IC unit 112. In addition, when more than one IC unit 112 is connected to controller 114, controller 114 may send duplicate messages in parallel to each IC unit 112 or may be configured to send messages to specific IC units 112 and their associated display units 110.

Global messages are messages that may be sent to and may contain instructions that may be executed by every display unit in the closed serial communication network. Global messages may include instructions, for example, to refresh the display panel, to change one or more display characteristics (e.g., intensity, color, hue, etc.), and the like. A global message may include a single instruction byte that may be executed by a first display unit in the network and then sent to the next display unit or, in the case of the final display unit in the network, back to controller 114. For example, referring to FIG. 2*a*, controller 114 may send a global message to display unit 102 by means of IC unit 112. Display unit 102 may receive the global message from controller 114, execute the message, and send the message to the next display unit (not shown). This may be repeated until display unit 108 receives the message, executes it, and sends the message back to controller 114 by means of IC unit 112. As another example, display unit 108 may receive the message from controller 114, execute the message, and send the message to the next display unit (not shown). This may be repeated until display unit 102 receives the message, executes it, and send the message back to controller 114 by means of IC unit 112. Accordingly, each display unit may receive the message from the previous display unit in the network, process it, and send it to the next display unit until the message has returned to controller 114.

Local messages may be sent to every display unit in the closed serial communication network but may be executed only by a specific display unit. Local messages may be used, for example, to provide each display unit with one or more frames for display, to instruct a specific display unit to change one or more display parameters (e.g., intensity, color, hue, and the like), to instruct a specific display to perform one or more diagnostic utilities, to instruct a specific display to restart, etc. A local message may include one or more instruction bytes, at least one address byte, and one or more data bytes.

In one exemplary embodiment, the address byte may be an integer from 0 to N−1, where N is the total number of display units, and a local message may only be executed when the address byte is equal to 0. Thus, before executing a local message, each display unit may check the address byte. If the address is 0, the display unit may execute the instruction. However, if the address is not 0, the display unit may decrement the address and send the message to the next display unit in the communication network. When the message is received by the appropriate display unit, the address will be 0 and that display unit may then execute the message. For example, referring to FIG. 2a, upon receipt of a local message, display unit 102 may check the address byte. If the address byte is 0, display unit 102 may execute the message. If the address is 1, display unit 102 may decrement the address and send the message to the next display unit (i.e., the display unit at row1, column2). Upon receipt of the local message, the display unit at row1, column2(not shown) may check the address byte. In this example, the display unit at row1, column2(not shown) may execute the message because the address will be 0. Likewise, if the address is 2, display unit 102 may decrement the address, send the message to the next display unit, which may also decrement the address, and send the message to the next display unit, which may execute the message.

Using this exemplary addressing system associated with local messages, controller 114 or IC unit 112 may determine the total number of display units in a sign display panel. For example, referring to FIG. 1a, IC unit 112 may send a local message having any address value greater than the total number of display units. Each display unit may decrement the address value and pass the message to the next display unit. When the address value returns to IC unit 112 from the final display unit in the plurality of display units 110, the address may be equal to the initial address less the total number of display units. Thus, IC unit 112 may determine the total number of display units by subtracting the returned address value from the initial address value. Similarly, IC unit 112 may determine the total number of display units in each row by reading each address value returned to IC unit 112 from the final display unit in each row.

In another exemplary embodiment, a first address byte may be an integer from 0 to N−1, where N is the total number of display units, and a second address byte may be equal to N. Controller 114 may set the first address byte and, in this embodiment, the local message may only be executed when the first address byte is equal to second address byte (i.e., N=N). Thus, before executing a local message, each display unit may check the first and second address bytes. If the first address byte is equal to the second address byte, the display unit may execute the instruction. However, if the first address byte is not equal to the second address byte, the display unit may increment the first address byte and send the message to the next display unit in the network. When the message is received by the appropriate display unit, the first address byte will be equal to the second address byte, and that display unit may then execute the message. For example, referring to FIG. 2a, upon receipt of a local message, display unit 102 may check the first and second address bytes. If the first address byte is equal to the second address byte (e.g., first address byte=N), display unit 102 may execute the message. However, if the first address byte is not equal to the second address byte (e.g., first address byte=N−2, first address byte=N−1, first address byte=N+1, first address byte=N+2, etc.), display unit 102 may increment the address and send the message to the next display unit (i.e., the display unit at row1, column1). Upon receipt of the local message, the display unit at row1, column1(not shown) may check the address byte. In this example, the display unit at row1, column1(not shown) may execute the message because the first address byte will now be equal to the second address byte (e.g., first address byte=N, second address byte=N). Likewise, if the first address byte is N−2, display unit 102 may increment the address, send the message to the next display unit, which may also increment the address, and send the message to the next display unit, which may then execute the message.

Using this exemplary addressing system associated with local messages, controller 114 or IC unit 112 may determine the total number of display units in a sign display panel. For example, referring to FIG. 1a, IC unit 112 may send a local message having an address value (first or second) equal to 0. Each display unit may increment the address value and pass the message to the next display unit. When the address value returns to IC unit 112 from the final display unit in the plurality of display units 110, the address may be equal to the total number of display units. In addition, IC unit 112 may determine the total number of display units in each row by reading each address value returned to IC unit 112 from the final display unit in each row. Other manners of determining the number of display units may also be implemented.

Communication integrity messages are messages that may be sent to every display unit in the closed serial communication network. Communication integrity messages may be used to determine the communication status of the communication network. Typically, controller 114 may send a communication integrity message to the first display unit in the closed serial communication network, and each display unit sends it to the adjacent display unit in the network until the message is received again by controller 114. Communication integrity messages may consist of a single byte that is sent to each display unit. Thus, the communication integrity message, in one embodiment, may be a single byte instructing each display unit to send it to the next display unit or back to controller 114.

For example, controller 114 may periodically send a communication integrity message to the first display unit in the closed serial communication network by means of IC unit 112. If controller 114 does not receive the communication integrity message back from the last display unit in the closed serial communication network within a predetermined period of time (e.g., 7 seconds), timer 316 of controller 114 may send an interrupt to CPU 302. Moreover, each display unit may be programmed to send an error message if it does not receive a communication integrity message within a specified period of time. For example, each display unit may include a timer 516 that sends an interrupt to CPU 502 of the display unit if the communication integrity message has not been received within a predetermined period of time (e.g., 5 seconds). The interrupt may cause the display unit to send an error message to an adjacent display unit or an associated IC unit 112 and then on to controller 114. The error message may include an integer, which is decremented or incremented, depending on the addressing scheme, by each display unit that receives it until it is received again by controller 114. In this way, controller 114 may recognize which display unit first detected the communication error. As discussed with global and local messages, communication integrity messages may flow in either the forward or reverse direction.

For example, referring to FIG. 2a, consider sign display panel 100a in which there may be two rows and two columns of display units. The exemplary closed serial communication network may consist only of controller 114, IC unit 112, and display units 102, 104, 106, and 108. In this embodiment, controller 114 may be programmed with N or any number greater than N, where N is the total number of display units. Thus, in this example, the integer may be greater than or equal to 3. Controller 114 may send a communication integrity message to display unit 102 by means of IC unit 112. If display unit 104 does not receive the communication integrity message within a predetermined period of time, display unit 104 may send an error message to display unit 106 by means of IC unit 112. The error message may include any integer greater than or equal to N−1. Display unit 106 may receive the error message, decrement the integer, and send the error message to the next display unit. Each display unit that receives the error message may, in turn, decrement the integer until the error message is received by controller 114. In this example, the integer may be reduced by 2 and controller 114 may determine that the message was sent by display unit 104, the third to the last display unit. Thus, controller 114 may be configured to recognize the communication error between display units 102 and 104.

In an alternate embodiment, again referring to the diagram of FIG. 2a, in which the exemplary closed serial communication network again consists of controller 114, IC unit 112, and display unit 102, 104, 106, and 108. Controller 114 may be programmed with N, where N is the number of display units of the plurality of display units 110a. Thus, in this example, N may be equal to 3. Controller 114 may send a communication integrity message to display unit 102 by means of IC unit 112. If display unit 104 does not receive a communication integrity message within the predetermined period of time, display unit 104 may send an error message through IC unit 112 to display unit 106. The error message may include an integer equal to 0, and each display unit that receives the error message may increment the integer. Thus, display unit 106 may receive the error message from display unit 104, increment the integer, and send the error message to display unit 108, which may also increment the integer. Display unit 108 may send the error message to controller 114 by means of IC unit 112. Controller 114 may determine that the message was sent by display unit 104, the third to the last display unit, because the integer has been increased by 2. Thus, controller 114 may be configured to recognize the communication error between display units 102 and 104.

Communication errors may be caused by a number of factors, such as a temporary nearby electrical field, the presence of water inside one of the display units, etc. Communication errors may also be caused by display unit failures, communication line failures (wired and/or wireless), and the like. When controller 114 recognizes a communication error, controller 114 may perform a diagnostic by, for example, resetting one or more display units. If the communication error still exists, controller 114 may shut down one or more display units and restart them. If the communication error still exists, controller 114 may shut down one or more display units, wait a period of time such as an hour, and then restart them. If the communication error is still not resolved, controller 114 may be operated in a supervisory mode and thereby may allow a user to test each display unit to determine the cause of the communication error. Additional diagnostic utilities may be undertaken as is understood by those skilled in the art. Because, in this embodiment, each display unit may report errors detected from a previous display unit in the communication network, the error checking method need not depend upon the malfunctioning display unit and is, therefore, reliable.

Figure 6:
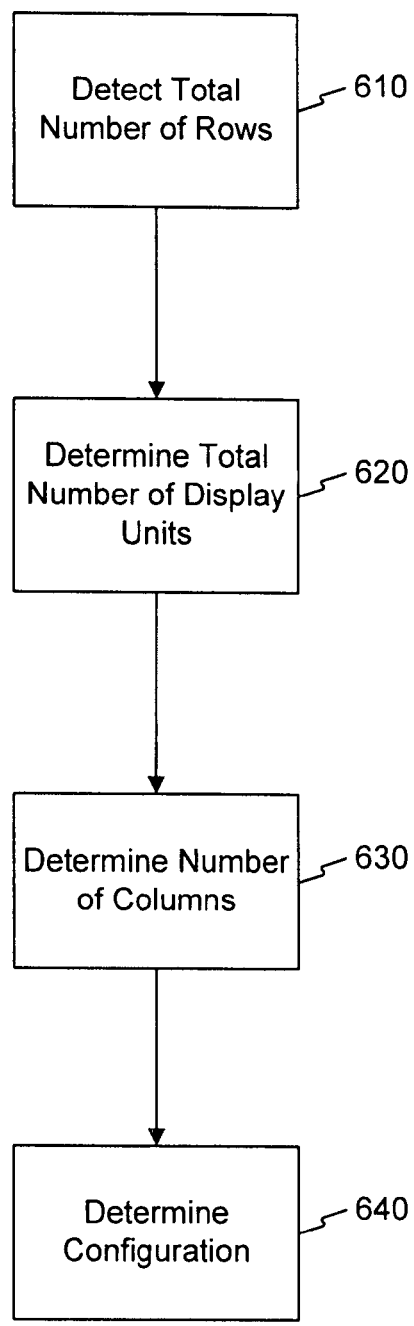
FIG. 6 shows a flow diagram of an exemplary method for automatic sign display panel configuration consistent with certain disclosed embodiments.

FIG. 6 shows a flow diagram depicting an exemplary method for automatic sign display panel configuration, consistent with certain disclosed embodiments. In one embodiment, the sign display panel may be configured as a matrix of display units having a number of rows and a number of columns. As described above in connection with FIGS. 4a and 4b, IC unit 112 may include software for polling each connection port 408 to determine the presence or absence of a connector. Accordingly, IC unit 112 may detect the total number of rows of display units (step 610). IC unit 112 may also determine the total number of display units (step 620). In one embodiment, IC unit 112 may determine the number of display units by sending a local message to each display unit as described above. In a decrementing address scheme, each display unit may decrement the address value of the local message and then send it on to the next display unit in the closed serial loop. CPU 402 of IC unit 112 may receive the address value from the final display unit connection port and, executing instructions from software stored in memory 406, may subtract the address value received from the final display unit connection port 408 from the initial address value to determine the total number of display units. In one embodiment of an incrementing address scheme, the first and second address byte may initially be set to a same integer value where the initial integer value is greater than 0. Each display unit may increment the first address byte of the local message and send the local message to the next display unit in the closed serial loop. CPU 402 of IC unit 112 may receive the first and second address bytes from the final display unit connection port 408 after the first address byte has been incremented by each display unit. CPU 402, executing instructions from software stored in memory 406, may subtract the second address byte from the first address byte of the local message received from the final display unit connection port to determine the total number of display units.

Thus, once the number of display units is determined, IC unit 112 may determine the number of columns of display units (step 630). Based on the detected number of display unit rows and columns, IC unit 112 may determine the configuration of display units 110 (step 640). In one embodiment, IC unit 112 may determine the number of columns in the matrix by dividing the total number of display units by the total number of rows. For example, referring to FIG. 1a, if IC unit 112 determines the total number of display units 110 is 25 and that 5 rows are occupied, IC unit 112 may determine that the sign display panel 100 is a 5×5 matrix of display units.

Controller 114 may receive the configuration of the sign display panel 100 from the IC unit 112 without user input. In other embodiments, controller 114 may determine the total number of display units and, therefore, controller 114 may automatically determine the configuration of the sign display panel 100 based on the number of occupied rows received from IC unit 112. Alternatively and/or additionally, one or more IC units 112 may determine the configuration of their associated display units 110, and controller 114 may determine the configuration of the sign display panel 100. For example, referring to FIG. 1b, IC unit 112a may determine the configuration of display units 110a and IC unit 112b may determine the configuration of display units 110b. IC units 112a and 112b may send the configuration information to controller 114, and controller 114 may determine the configuration of sign display panel 100b. In addition, a sign display panel may be automatically reconfigured following an error or bypass of one or more rows. That is, if IC unit 112 bypasses one or more rows, the dynamic message sign display panel may be automatically reconfigured in a similar manner.

Figure 7:
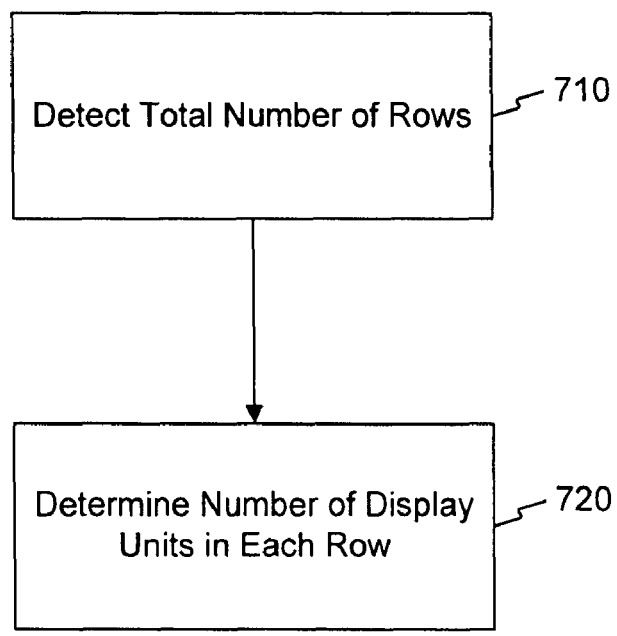
FIG. 7 shows a flow diagram of an exemplary method for automatic sign display panel configuration consistent with certain disclosed embodiments.

FIG. 7 shows a flow chart of an exemplary method for automatic sign display panel configuration, consistent with certain disclosed embodiments. In one embodiment, IC unit 112 may determine the configuration of its associated one or more display units 110 by polling the connection ports to detect each row (step 710) in a manner similar to that described above in connection with step 610 of FIG. 6. Further, IC unit 112 may determine the total number of display units corresponding to each row (step 720). For example, referring to IC unit 112 shown in FIG. 4a, in a decrementing address scheme, CPU 402 may receive the address value from each display unit connection port after the address value has been decremented by the display units in the corresponding row. CPU 402 may execute software instructions stored in memory 406 to subtract each such address value from the address value corresponding to the previous display unit connection port. For example, display unit connection port 408*a* may return an address value of 7 after the address value has been decremented by each display unit in the row corresponding to display unit connection port 408*a*. Display unit connection port 408*b* may return an address value of 4 after the address value has been decremented by each display unit in the row corresponding to display unit connection port 408*b*. CPU 402 may subtract the address byte value returned from display unit connection port 408*b* from the address byte value returned from display unit connection port 408*a* to determine the total number of display units in the row of display units corresponding to display unit connection port 408*b*. Similarly, CPU 402 may subtract the address value returned from display unit connection port 408*c* from the address value returned from display unit connection port 408*b* to determine the number of display units in the row corresponding to display unit connection port 408*c*.

In an incrementing address scheme, CPU 402 may receive the address value from each display unit connection port 408 after the address value has been incremented by the display units in the corresponding row. CPU 402 may execute software instructions stored in memory 406 to subtract the incremented address byte value of the previous row from the incremented address byte value of the current row to determine the number of display units in the current address row. For example, display unit connection port 408*a* may return an address byte value of 3 after the address byte value has been incremented by each display unit in the row corresponding to display unit connection port 408*a*. Display unit connection port 408*b* may return an address byte value of 6 after the address byte value has been incremented by each display unit the row corresponding to display unit connection port 408*b*. CPU 402 may subtract the address byte value returned from display unit connection port 408*a* from the address byte value returned from display unit connection port 408*b* to determine the number of display units in the row corresponding to display unit connection port 408*b* (e.g., 3 display units). Similarly, CPU 402 may subtract the address byte value returned from display unit connection port 408*b* from the address byte value returned from display unit connection port 408*c* to determine the number of display units in the row corresponding to display unit connection port 408*c*.

In this manner, IC unit 112 may send controller 114 configuration information consisting of the number of rows and the number of display units corresponding to each row. The configuration of sign display panel 100 may be determined in this manner when sign display panel 100 includes only a single IC unit 112 and its associated display units 110. Alternatively and/or additionally, when sign display panel 100 includes more than one IC unit 112, each IC unit 112 may send configuration information associated with its associated display units 110, and controller 114 may thereby determine the configuration of sign display panel 100. For example, referring to FIG. 1*b*, IC units 112*a* and 112*b* may determine their configuration information as described above in connection with FIG. 7, and may send their individual configuration information to controller 114. Using the individual configuration information, controller 114 may, in turn, determine the configuration of sign display panel 100*b*.

Figure 8:
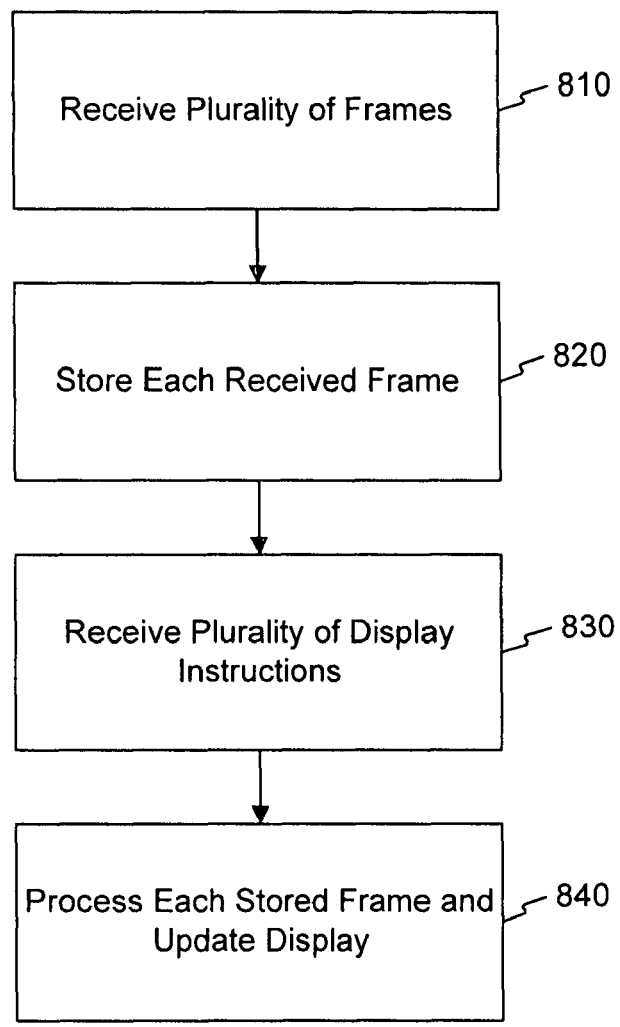
FIG. 8 shows a flow diagram of an exemplary method for rapidly refreshing a sign display panel consistent with certain disclosed embodiments.

FIG. 8 shows a flow diagram of a method for rapidly refreshing a sign display panel, consistent with certain disclosed embodiments. FIG. 8 is described with reference to the block diagram of the exemplary display unit shown in FIG. 5.

Local messages may be used to provide each display unit with one or more sets of display data. A frame may include one or more bytes of data that are processed by CPU 502 to instruct output drivers 518 to update the display unit device 520. Display data may include one or more frames of data for display. In one exemplary embodiment, a frame of display data may be eight bytes. However, a frame of display data may be other sizes as well.

Each display unit may be configured to receive a plurality of local messages (step 810), each containing one or more frames. In addition, each display unit may store the one or more frames contained in the plurality of local messages in RAM 504 (step 820). Each frame may also include a frame identifier, which may be one or more bytes of data that identifies the frame for subsequent processing. Thus, when a display unit receives a local message that has been addressed to it, as described above, CPU 502 may execute instructions in the local message and store each received frame in RAM 504. In one embodiment, RAM 504 may be large enough to store multiple frames of display data.

Controller 114 may then send a plurality of global messages, which may be received by each display unit in series, instructing each display unit to refresh display output device 520 (step 830). The display instruction, when executed by CPU 502, may instruct the display unit to process one or more of the frames stored in RAM 504. The display instruction may include a first set of one or more bytes of data that is received by the display unit. In one exemplary embodiment, the first set of one or more bytes of data may be one byte of data. In one exemplary embodiment, the display instruction may also include a second set of one or more bytes of data corresponding to the frame identifier. For example, the second byte of data may be an integer that corresponds to the integer identifying the frame.

In one exemplary embodiment, CPU 502 may compare the display instruction integer to each frame identifier for each frame stored in RAM 504 and then process the corresponding frame (step 840). In another embodiment, the display instruction may instruct the display unit to process the first available frame in RAM 504. In response to each display instruction, CPU 502 may process the frame in RAM 504 identified by the display instruction and send the results to the output drivers 518, which updates display output device 520. Thus, each display unit may rapidly refresh its display without the delay associated with controller 114 sending additional frames before sending the instruction to refresh the display.

Figure 9:
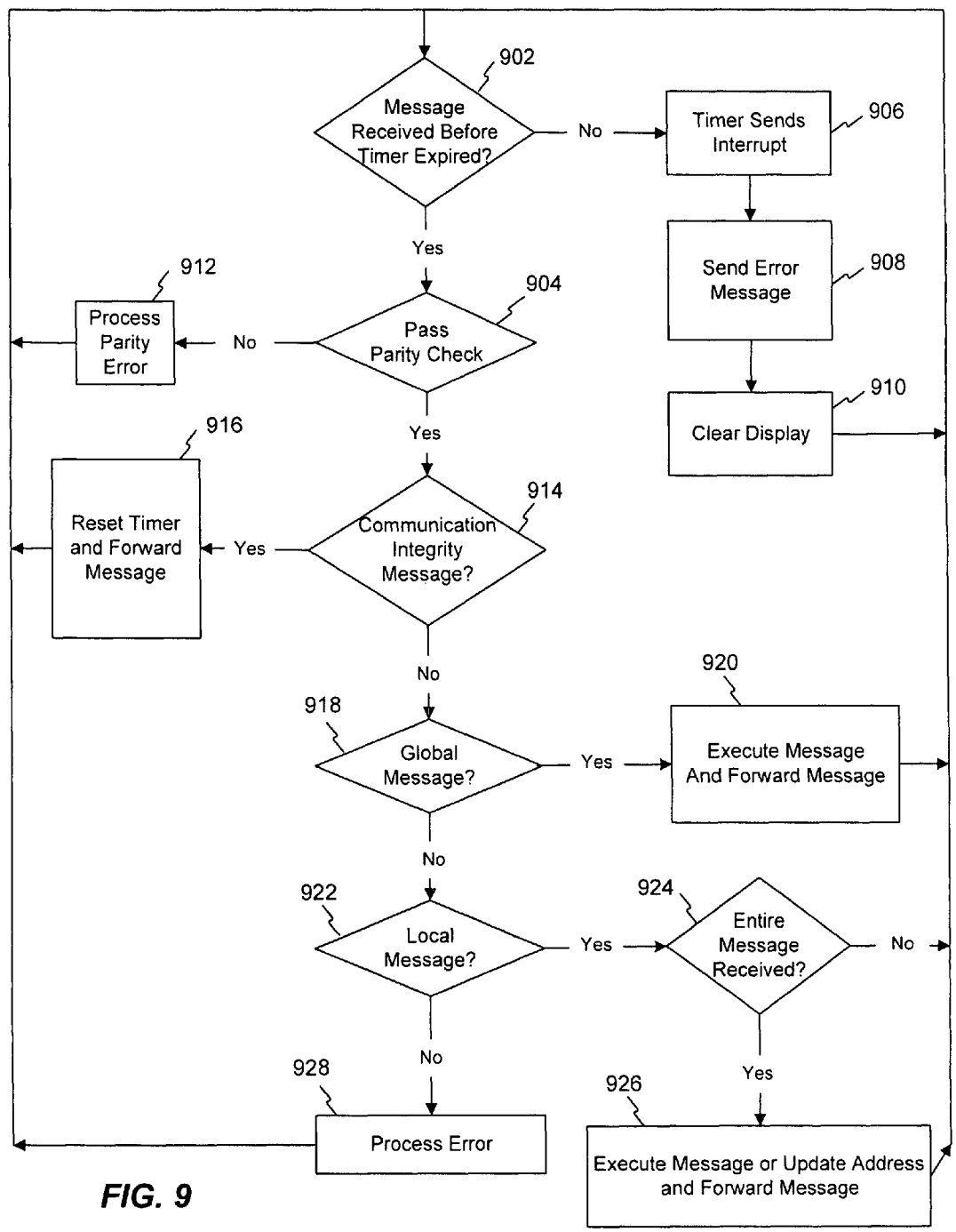
FIG. 9 shows a flow diagram of an exemplary method for error checking in a sign display panel communication network consistent with certain disclosed embodiments.

FIG. 9 shows a flow diagram of an exemplary method for error checking in an exemplary sign display panel communication network, consistent with certain disclosed embodiments. For illustrative purposes, the flow diagram is described with reference to the block diagram of the display unit shown in FIG. 5. In one embodiment, the display unit may wait to receive data from another display unit or controller 114 (step 902). The data may include, for example, a global message, a local message, a communication integrity message, etc.

If the data is not received before timer 516 expires, timer 516 may send an interrupt to CPU 502 (step 906). Timer 516 may be set to expire after a predetermined period of time (e.g., 7 seconds, etc.), and may be reset when the display unit receives a communication integrity message as described below. Upon receiving the interrupt, CPU 502 may send an error message to the next display unit or to controller 114 (step 908). In response, CPU 502 may instruct output drivers 518 to clear the display output device 520 (step 910). In one exemplary embodiment, an error message may be a global message instructing each display unit to clear its display output device 520.

If the data is received before timer 516 expires, CPU 502 may perform a parity check on the received data (step 904). In one embodiment, the received data may include a parity bit. CPU 502 may check the received data to determine the parity of the received data. Once determined, CPU 502 may compare the determined parity to the parity bit for consistency. If the received data fails the parity check (i.e. the determined parity of the received data does not match the parity bit), CPU 502 may process a parity error (step 912). In one embodiment, processing the parity error may include disposing of the data, instructing the output drivers 518 to clear the display output device 520, sending an error message to the next display unit or controller 114, etc.

If the received data does not fail the parity check, CPU 502 may determine if the data is a communication integrity message (step 914). To do so, in one embodiment, the data may include a designated bit that, when set, designates the data as a communication integrity message. Accordingly, CPU 502 may check the designated bit to determine if the data is a communication integrity message. If the data is a communication integrity message, CPU 502 may reset timer 516 and forward the received data to the next display unit or to controller 114 (step 916).

If, however, the data is not a communication integrity message, CPU 502 may determine if the data is a global message (step 918). In one embodiment, the data may include a designated bit that, when set, designates the data as a global message. Accordingly, CPU 502 may check the designated bit to determine if the data is a global message. If so, CPU 502 may execute a global message instruction included in the data and then send the data to the next display unit or controller 114 (step 920).

However, if the byte is not a global message, CPU 502 may determine if the data is part of a local message designated for that display unit (step 922). In one embodiment, the data may include a designated local message bit that, if set, designates the data as part of a local message. CPU 502 may check the local message bit to determine if the data is part of a local message.

If the data is part of a local message, CPU 502 may determine if it has received the entire local message (step 924). A complete local message may contain, for example, one or more instruction bytes, one or more address bytes, one or more data bytes, etc. If not, CPU 502 may wait to receive additional data (step 902).

CPU 502 may check the one or more address bytes to determine if the local message is designated for that display unit. If CPU 502 determines it has received the entire local message and the message is designated for that display unit, CPU 502 may execute the message (step 926). For example, in a decrementing address scheme, if the address byte is 0, CPU 502 may execute the message. However, if the address byte is not 0, CPU 502 may decrement the address byte and forward the message to the next display unit or controller 114. As another example, in an incrementing address scheme, if the first address byte is equal to the second address byte, CPU 502 may execute the message. If, however, the first address byte is not equal to the second address byte, CPU 502 may increment the address byte and forward the message to the next display unit or controller 114.

If the byte is not part of a local message, a global message, or a communication integrity message, CPU 502 may determine that an error may have occurred. As a result, CPU 502 may process the error (step 928). Processing the error may include instructing output drivers 518 to clear display unit device 520, and sending an error message to the next display unit or controller 114. In addition, processing the error may include logging the error in controller 114, IC unit 112, and/or display unit 110 for later review. Further, a notification of the error may be sent to a remote entity, such as, for example, one or more of a manufacturer, owner, operator, repair company and/or personnel, lessor/lessee, regulatory body and/or personnel, highway personnel, etc. For example, controller 114 may be configured to notify an owner of an error, error type, error location, and the like. Notification may be sent through a network, as discussed above, and may be made through any means of communication, such as, for example, electronic mail, facsimile, pager, automated phone call, SMS messaging, and the like.

Figure 10:
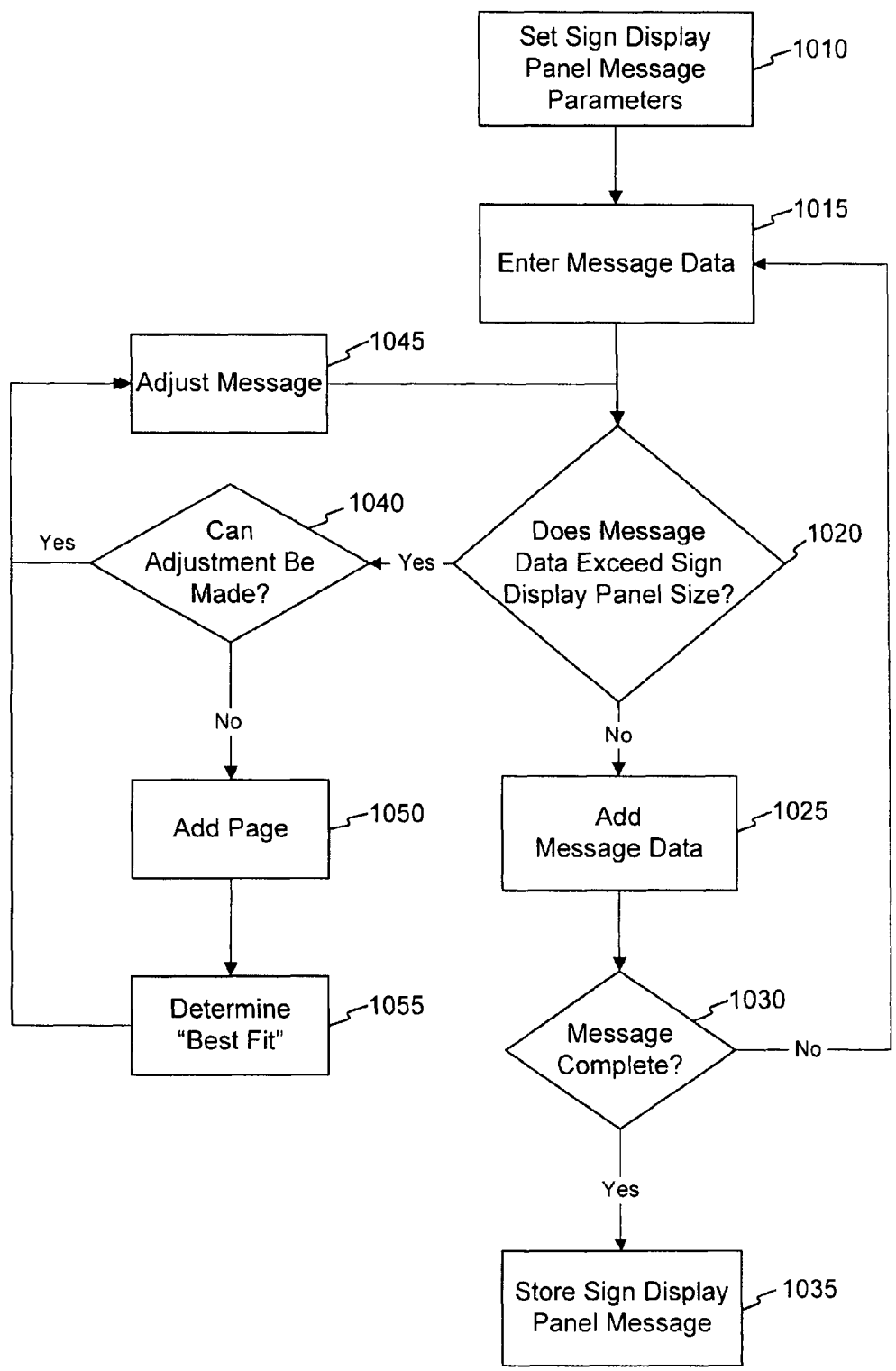
FIG. 10 shows a flow diagram of an exemplary method for configuration of sign display panel messages consistent with certain disclosed embodiments.

FIG. 10 shows a flow diagram of an exemplary method for configuring a sign display panel message consistent with certain disclosed embodiments. Initially, one or more threshold message parameters may be set by a user of the dynamic message sign display panel (step 1010). The one or more threshold message parameters may include for example, one or more fonts types and/or sizes, minimum and/or maximum size of numbers, letters, symbols, and/or graphics (e.g., height and width of characters in pixels), minimum and/or maximum spacing between numbers, letters, symbols, and/or graphics (e.g., pixel spacing), minimum and/or maximum intensity of pixels and/or hues, display style (e.g., static, scrolling, blinking, etc.), minimum and/or maximum display speed (e.g., minimum and/or maximum scrolling speed, minimum and/or maximum blinking speed, minimum and/or maximum length of static display, etc.), and the like. Threshold message parameters may be set based on any combination of user preference, statutory and/or regulatory requirements, and the like.

In addition, the user may be restricted to certain threshold message parameters and/or messages based on an access level associated with the user. For example, a user with a first level of access may only be allowed to enter a message. Conversely, a user with a second level of access may be allowed to change a threshold message font type and/or size in addition to message entry. A user with a third level of access may be allowed to modify and/or edit all features and messages associated with the dynamic message sign display panel, as well as to perform diagnostic or other maintenance functions. Access restrictions may be implemented using software executed by controller 114.

Setting threshold message parameters may further include the creation of an alternate set of sign display panel messages. That is, controller 114 may be configured to identify and display one or more alternate sign display panel messages based on the detection of one or more errors and/or reconfiguration of the sign display panel. For example, referring to FIG. 1b, if an error is detected in row$2_a$, IC unit 112a may bypass row$2_a$ thereby preventing any display unit in row$2_a$ from displaying its portion of the sign display panel message. Once controller 114 receives notification of the error and/or bypass, controller 114 may determine if an alternate sign display panel message has been entered and stored for that particular error. Alternate sign display panel messages may be stored for any error situation and/or reconfiguration (e.g., low pixel intensity, failure of a specified number of pixels within a display unit, failure of one or more individual display units, failure of rows of display units, failure of one or more IC units 112, etc.). Alternate sign display panel messages may be determined based on any combination of user preference, statutory and/or regulatory requirements, and the like. In addition, controller 114 may be configured to cause IC unit 112 to bypass one or more rows caused by failures in other rows. For example, controller 114 may be configured to direct IC unit 112b to bypass row2$_b$ when row2$_a$ is bypassed by IC unit 112a.

Once the sign display panel threshold message parameters have been determined, the user may enter message data into controller 114 (step 1015). Message data may include any combination of characters including, for example, letters, numbers, symbols, graphics, and the like. Message data may be entered through any type of user interface, such as, for example, a keyboard, mouse, voice recognition software, touch screen, file transfer, or any other means of entering data into a computing system.

Controller 114 may determine if the entered message data string causes the message to exceed the sign display panel size (step 1020). The determination may occur concurrent with entry of message data (e.g., between entry of individual characters, etc.), subsequent to entry of message data (e.g., following entry of an entire message string, following entry of individual characters in the message string, etc.), and/or prior to entry of message data (e.g., prior to entry of an entire message string, prior to entry of individual characters in the message string, etc.). In one exemplary embodiment, on a character-by-character basis, controller 114 may evaluate the message to determine if the message fits within the sign display panel. For example, if the user seeks to enter the message, "RIGHT LANE CLOSED AHEAD," controller may evaluate the message data string upon the entry of each character (i.e., R, I, G, H, T, "space," L, A, N, E, "space," C, L, O, S, E, D, "space," A, H, E, A, and D). Thus, in this example, controller 114 may evaluate the message 23 times before the message is complete.

If controller 114 determines that the entered message data string, including the most recently entered character, fits within the sign display panel (step 1020, Yes), controller 114 may leave the sign display panel message parameters unchanged and may add the most recently entered character to the message data string (step 1025). If the message data string is complete (step 1030, Yes), controller 114 may store the message (step 1035).

If controller 114 determines that the entered message data string, including the most recently entered character, is too large to fit within the sign display panel (step 1020, No), controller 114 may determine if the sign display panel message can be adjusted (step 1040). Controller 114 may make this determination based on the threshold message parameters stored in step 1010. For example, controller 114 may determine if one or more alternate minimum and/or alternate maximum sign display panel parameters and/or sign display panel message parameters were entered in step 1010 (e.g., minimum and/or maximum height and/or width of numbers, letters, symbols, and/or graphics, minimum and/or maximum spacing between numbers, letters, symbols, and/or graphics, etc.). Based on the stored one or more alternate minimum and/or maximum sign display panel threshold parameters and/or sign display panel threshold message parameters, controller 114 may then determine if the current sign display panel and/or sign display panel message parameters may be adjusted, either greater or smaller, and still remain within the sign display panel threshold parameters and/or sign display panel threshold message parameters defined in step 1010.

If controller 114 determines that an adjustment can be made, controller 114 may adjust one or more parameters associated with the sign display panel message (step 1045). For example, if the message font size is greater than a minimum font size stored in controller 114 (i.e., the height is greater than a minimum height, the width is greater than a minimum width, both height and width are greater than a minimum height and width, etc.), controller 114 may reduce the message font size (i.e., height, width, both height and width, etc.). As another example, if the distance between message characters is greater than the minimum distance stored in controller 114, controller 114 may decrease the distance between characters. As a further example, if the message is currently displayed on a single line, controller 114 may display the message using two or more lines. Once an adjustment is made to the message data string, controller 114 may once again determine if the message data string fits the sign display panel (step 1020).

If controller 114 determines that the sign display message parameters and/or sign display panel message parameters cannot be adjusted (step 1040, No), controller 114 may add a page to the sign display panel message (step 1050). For example, controller 114 may determine that the sign display message parameters cannot be adjusted if the message font size is at a minimum font size (i.e., the height is equal to a minimum height, the width is equal to a minimum width, both height and width are equal to a minimum height and width, etc.), the distance between message characters is equal to a minimum distance, the message is currently displayed on the maximum allowable number of lines for a single display page, etc. In one exemplary embodiment, a page may be considered a single display of data on sign display panel 100. By adding a page to the sign display panel message, controller 114 may display the message using a plurality of single displays of data or frame sets on sign display panel 100. That is, a first part of the message may be displayed as a single page using a first set of frames, a second part of the message may be displayed as a second page using a second set of frames, and so on.

If controller 114 adds a page to the sign display panel message, controller 114 may determine a "best fit" for the sign display panel message (step 1055). For example, in one embodiment, controller 114 may divide the message across the pages and may determine if one or more sign display panel and/or sign display panel message parameters may be adjusted (e.g., increased, shifted, etc.). Controller 114 may then adjust one or more sign display panel and/or sign display panel message parameters associated with sign display panel message (step 1045). For example, controller 114 may increase the message font size (i.e., character height, character width, both character height and width), reduce the message font size (i.e., character height, character width, both character height and width, etc.), adjust the distance between message characters, etc. As another example, if the message is currently displayed on a single page with multiple lines, controller 114 may adjust the message and display the message using a plurality of pages having a single line on each page. Once an adjustment is made to the sign display panel message, controller 114 may once again determine if the sign display panel message fits within the sign display panel (step 1020).

Controller 114 may also evaluate the sign display panel message to determine that a break in pages does not distort the intended message. For instance, referring to the exemplary message, "RIGHT LANE CLOSED AHEAD," if the message is static and alternating between two pages, controller 114 may verify that the words, "RIGHT LANE," remain together on one page and the words, "CLOSED AHEAD," remain together on a second page. Thus, controller 114 may verify that the message will not be displayed as "LANE CLOSED" and "RIGHT AHEAD." Similarly, controller 114 may verify that one or more predetermined words or sets of words are not separated, that only certain words or sets of words are separated, etc. These verifications may be done based on one or more parameters entered in step 1010 or through parameters previously defined and stored in controller 114.

Configuration of a sign display panel message may occur upon the initial entry of a message, change of a message, automatic reconfiguration of the sign display panel due to errors, failures, environmental conditions, and the like, etc. In one embodiment, the configuration of a sign display panel message may be performed using controller 114. Alternatively, the configuration may be done remotely and then stored in controller 114. For example, a remotely located user may utilize a remote computing system to generate configuration information reflecting one configuration of a sign display panel message. The remote user may then send the configuration information to controller 114 via a communication network (e.g., LAN, WAN, copper wire, fiber optic wire, etc.). In addition, IC unit 112 may automatically configure and/or reconfigure sign display panel messages.

Figure 11:
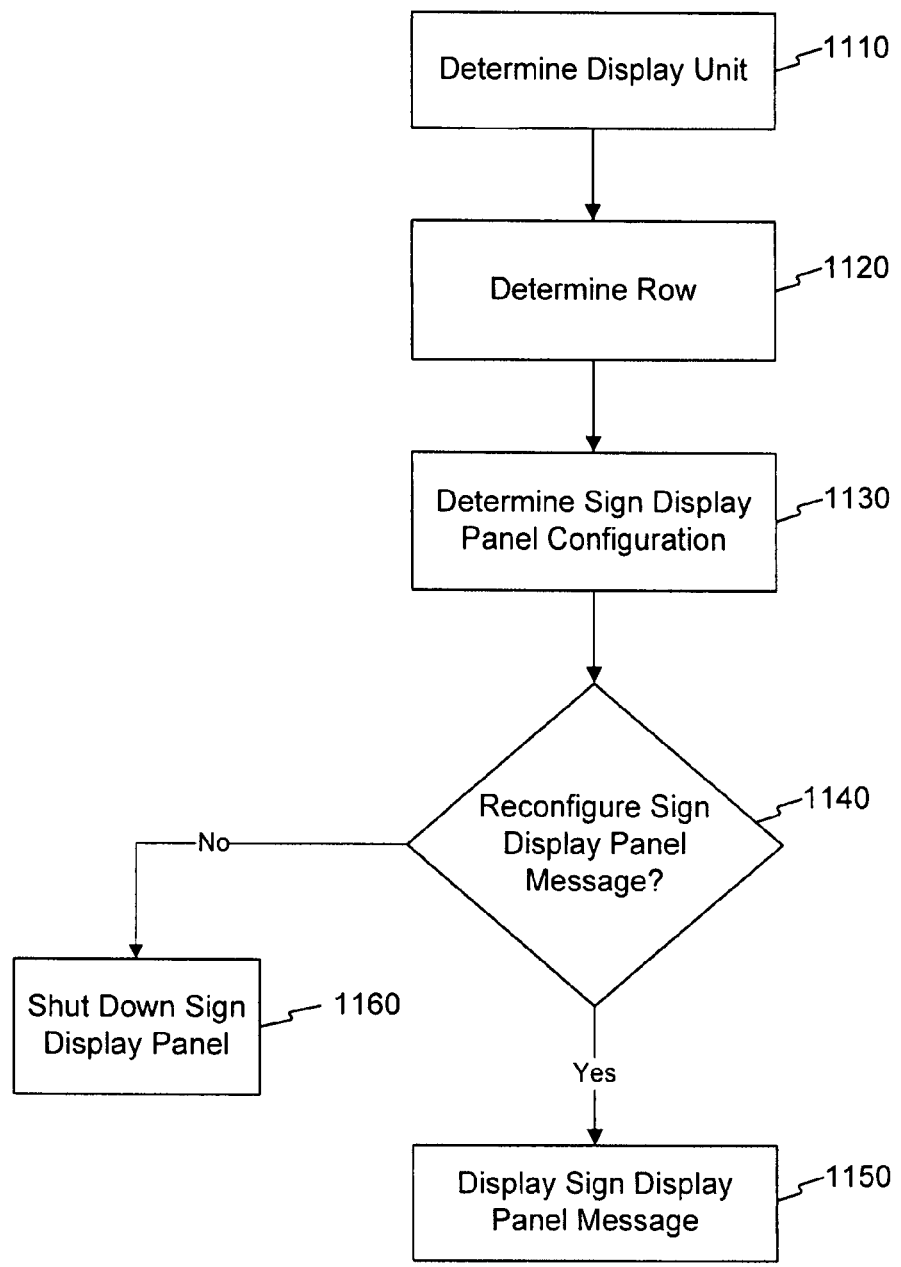
FIG. 11 shows a flow diagram of an exemplary method for reconfiguration of sign display panel messages consistent with certain disclosed embodiments.

FIG. 11 shows a flow diagram of an exemplary method for reconfiguring a sign display panel message in a sign display panel communication network consistent with certain disclosed embodiments. The flow diagram will be described with reference to the block diagram of a display unit as shown in FIG. 1. Once controller 114 receives an error message, controller 114 may determine the display unit associated with the detected error (step 1110). Further, controller 114 may also determine the row associated with the detected error (step 1120). In one embodiment, controller 114 may determine the display unit and the row associated with the detected error based on the configuration information described above.

Once controller 114 has determined the row and/or display unit associated with the detected error, controller 114 may determine a new sign display panel configuration (step 1130). In one embodiment, controller 114 may determine the new configuration in a manner similar to that described in connection with FIGS. 6 and 7. For example, if an error is detected in a row, IC unit 112 may bypass the row and controller 114 may automatically detect and implement the new sign panel configuration.

Once controller 114 has determined the new sign panel configuration, controller 114 may determine if the sign display panel message may be reconfigured, in a manner similar to that discussed above in connection with FIG. 10. For example, controller 114 may reconfigure the sign display panel message by adjusting of one or more sign display panel message parameters and/or implementing one or more alternate messages. If the sign display panel message may be reconfigured (step 1140, Yes), the controller 114 may store the new message and the sign display panel may display the sign display panel message (step 1150).

If, however, it is determined that the sign display panel message cannot be reconfigured (e.g., the number of row failures exceeds a predetermined threshold, the number of rows failures in certain row positions exceeds a predetermined threshold, the number of pixel failures exceeds a predetermined number or ratio, one or more IC units 112 has failed, etc.), controller 114 may shut down sign display panel 100 (step 1160). In addition, controller 114 may log certain information associated with the sign display panel (e.g., number, type, and location of failures, diagnostic information, etc.), and may send notification to a user as discussed above.

In another embodiment, IC unit 112 may perform the steps described above in connection with FIG. 11. That is, once IC unit 112 receives an error message, IC unit 112 may determine the display unit in which the error was detected (step 1110), and may further determine the row in which the error was detected (step 1120). IC unit 112 may determine both the display unit and the row using the configuration information as discussed above.

Once IC unit 112 has determined the row and/or display unit associated with an error, IC unit 112 may determine a new sign display panel configuration (step 1130). In one embodiment, IC unit 112 may determine the new configuration in a manner similar to that described above in connection with FIGS. 6 and 7. For example, if an error is detected in a row, IC unit 112 may bypass the row and may automatically detect and implement a new sign display panel configuration.

Once IC unit 112 has determined the new sign display panel configuration, IC unit 112 may determine if the sign display panel message may be reconfigured, in a manner similar to that discussed above in connection with FIG. 10. For example, IC unit 112 may reconfigure the sign display panel message by adjusting one or more sign display panel message parameters and/or implementing one or more alternate sign display panel messages. If the sign display panel message can be reconfigured (step 1140, Yes), IC unit 112 may display the reconfigured sign display panel message (step 1150).

If, however, it is determined that the sign display panel message cannot be reconfigured (e.g., the number of row failures exceeds a predetermined threshold, the number of rows failures in certain row positions exceeds a predetermined threshold, the number of pixel failures exceeds a predetermined number or ratio, etc.), IC unit 112 may shut down its associated display units 110 (step 1160). In addition, IC unit 112 may log certain information associated with its associated display units 110 (e.g., number, type, and location of failures, diagnostic information, etc.), and may send notification to controller 114 for further processing as discussed above.

As is understood, the error detection method may be incorporated with a sign display panel configuration consisting of any number of display units. Also, the error detection method may be incorporated into any sign communication system. For example, the error detection method may be incorporated into a communication system including display units that are each assigned an individual address. In this embodiment, each display unit may perform an error check of the information received from controller 114 and send error messages back to controller 114 if an error is detected. Also, controller 114 may send communication integrity messages to each display unit, and each display unit may send an error message back to controller 114 if the communication integrity message is not received within a specified period of time.

As discussed above, an error may be detected and a message sent when, for example, a display unit does not receive a communication integrity message within a predetermined period of time, one or more environmental sensors detects an environmental condition outside of a predetermined range of acceptable environmental conditions (e.g., bright light, high winds, etc.), a display unit detects an error or failure within itself that does not inhibit its ability to receive and forward communication integrity messages (e.g., pixel failures, etc.), and the like. As also discussed above, the error may be logged and notification sent to a remotely located entity. Further, either controller 114 or IC unit 112 may reconfigure the sign display panel or sign display panel to allow continued operation of the sign display panel 100.

What is claimed is:

1. A sign display panel for displaying a sign display panel message, the sign display panel comprising:
   at least one set of display units connected in a closed serial loop, wherein each of the at least one set of display units includes a plurality of display units connected in a closed serial loop, each of the plurality of display units including:
- a display unit central processing unit (CPU) configured to execute software instructions associated with display of the sign display panel message,
- a display unit memory configured to store the software instructions for execution by the display unit CPU, and
- a plurality of display elements configured to respond to signals sent from the display unit CPU, at least one interconnect (IC) unit coupled to a first display unit and a second display unit included in the at least one set of display units, the at least one IC unit including:
- an IC unit central processing unit (CPU) configured to execute software instructions for determining a configuration of the at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units; and
- an IC unit memory configured to store the software instructions for execution by the IC unit CPU; and a controller connected to the at least one IC unit.

2. The sign display panel of claim 1, wherein the IC unit CPU is further configured to execute software instructions for configuring at least a portion of the sign display panel message based on one or more parameters associated with the at least one set of display units and the configuration of the at least one set of display units.

3. The sign display panel of claim 2, wherein the one or more parameters reflects at least one of a number of pixels in height, a number of pixels in width, and a number of pixels between characters.

4. The sign display panel of claim 1, wherein the display unit CPU is further configured to execute instructions for determining a condition associated with the at least one set of display units and to send a message to the at least one IC unit.

5. The sign display panel of claim 4, wherein the IC unit CPU is further configured to execute software instructions for determining an updated configuration of the at least one set of display units based on the message.

6. The sign display panel of claim 4, wherein the condition includes an error condition and the message includes an error message.

7. The sign display panel of claim 4, further including:
at least one environmental sensor, wherein the at least one environmental sensor is located near the at least one set of display units.

8. The sign display panel of claim 7, wherein the condition is associated with at least one environmental parameter sensed by the at least one environmental sensor and the message includes the at least one environmental parameter.

9. The sign display panel of claim 8, wherein the at least one environmental parameter includes a light level.

10. The sign display panel of claim 1, wherein the sign display panel message includes one or more characters.

11. The sign display panel of claim 10, wherein the one or more characters includes any combination of letters, numbers, graphics, or spaces.

12. The sign display panel of claim 1, wherein the sign display panel includes a number of IC units equal to a number of sets of display units.

13. The sign display panel of claim 1, wherein the at least one set of display units includes a first set of display units and the at least one IC unit includes a first IC unit, the sign display panel further including:
- a second set of display units, each display unit in the second set of display units connected to at least one other display unit in the second set of display units; and
- a second IC unit, the second IC unit connected to a first display unit and a second display unit included in the second set of display units.

14. The sign display panel of claim 13, further including:
a controller, wherein the controller is connected to the first IC unit and the second IC unit.

15. The sign display panel of claim 13, wherein each IC unit of the at least one IC units is associated with one set of display units of the at least one set of display units.

16. The sign display panel of claim 1, wherein each set of display units displays a portion of the sign display panel message.

17. The sign display panel of claim 16, wherein the portion of the sign display panel message includes the entire portion of the sign display panel message.

18. A method for sign display panel communication for use in a sign display panel, the method comprising:
connecting a controller, an interconnect (IC) unit, and at least one set of display units in a closed serial loop, wherein each display unit of the at least one set of display units includes a plurality of display elements, and wherein the IC unit includes an IC unit central processing unit (CPU) configured to execute software instructions for determining a configuration of the at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units, and an IC unit memory configured to store the software instructions for execution by the IC unit CPU;

determining a sign display panel configuration, wherein the sign display panel includes the at least one set of display units; and determining a sign display panel message configuration based on the sign display panel configuration.

19. The method of claim 18, further including:
detecting a condition associated with at least one display unit in the at least one set of display units; and
determining an updated configuration of the sign display panel based on the detected condition.

20. The method of claim 19, further including:
determining an updated configuration of the sign display panel message based on the updated configuration of the sign display panel.

21. The method of claim 19, further including:
sending a message that indicates a location of the condition, wherein the location includes a display unit.

22. The method of claim 21, wherein sending the message further includes:
sending the message to the IC unit, wherein the IC unit determines an updated configuration of the sign display panel.

23. The method of claim 21, wherein sending the message further includes:
sending the message to the IC unit, wherein the IC unit determines an updated configuration of the sign display panel message.

24. The method of claim 21, wherein sending the message further includes:
sending the message to the controller, wherein the controller determines an updated configuration of the sign display panel.

25. The method of claim 21, wherein sending the message further includes:
sending the message to the controller, wherein the controller determines an updated configuration of the sign display panel message.

26. The method of claim 18, further including:
determining at least a portion of the sign display panel message configuration based on one or more parameters associated with the at least one set of display units and the configuration of the at least one set of display units.

27. The method of claim 26, wherein the one or more parameters includes at least one of a number of pixels in height, a number of pixels in width, or a number of pixels between characters.

28. A sign display panel for displaying a sign display panel message, the sign display panel comprising:
at least one set of display units, wherein each of the at least one set of display units includes a plurality of display units, each of the plurality of display units including:
a display unit central processing unit (CPU) configured to execute software instructions associated with the display of the sign display panel message,
a display unit memory configured to store the software instructions for execution by the display unit CPU, and
a plurality of display elements configured to respond to signals sent from the display unit CPU,
at least one interconnect (IC) unit connected to a first display unit and a second display unit included in the at least one set of display units, the at least one IC unit including:
an IC unit central processing unit (CPU) configured to execute software instructions for determining a configuration of the at least one set of display units, and
an IC unit memory configured to store the software instructions for execution by the IC unit CPU;
at least one environmental sensor, wherein the at least one environmental sensor is located near the at least one set of display units and is configured to detect an environmental condition; and
a controller connected to the at least one IC unit, wherein the controller includes a controller central processing unit (CPU) configured to execute software instructions for determining a configuration of the at least one set of display units, wherein the controller CPU is further configured to execute software instructions for configuring the at least a portion of the sign display panel message based on one or more parameters associated with the at least one set of display units, the detected environmental condition, and the configuration of the at least one set of display units, and
a controller memory configured to store the software instructions for execution by the controller CPU.

29. The sign display panel of claim 28, wherein the IC unit CPU is further configured to execute software instructions for configuring at least a portion of the sign display panel message based on one or more parameters associated with the at least one set of display units and the configuration of the at least one set of display units.

30. The sign display panel of claim 29, wherein the one or more parameters reflects at least one of a number of pixels in height, a number of pixels in width, and a number of pixels between characters.

31. A method for sign display panel communication, the method comprising:
connecting a controller, at least one interconnect (IC) unit, and at least one set of display units in a closed serial loop, wherein each display unit of the at least one set of display units includes a plurality of display elements, wherein the at least one IC unit includes:
an IC unit central processing unit (CPU) configured to execute software instructions for determining a configuration of the at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units; and
an IC unit memory configured to store the software instructions for execution by the IC unit CPU;
determining a sign display panel configuration, wherein the sign display panel includes the at least one set of display units; and
determining a sign display panel message configuration based on the sign display panel configuration and at least one display parameter.

32. The method of claim 31, further including:
detecting a condition associated with at least one display unit in the at least one set of display units; and
determining an updated configuration of the sign display panel based on the detected condition.

33. The method of claim 32, further including:
determining an updated configuration of the sign display panel message based on the updated configuration of the sign display panel and the at least one display parameter.

34. The method of claim 31, further including:
sending a message that indicates a location of the condition, wherein the location includes a display unit.

35. The method of claim 34, wherein sending the message further includes:
sending the message to the IC unit, wherein the IC unit determines the updated configuration of the sign display panel.

36. The method of claim 34, wherein sending the message further includes:
sending the message to the IC unit, wherein the IC unit determines the updated configuration of the sign display panel message.

37. The method of claim 34, wherein sending the message further includes:
sending the message to the controller, wherein the controller determines the updated configuration of the sign display panel.

38. The method of claim 34, wherein sending the message further includes:
sending the message to the controller, wherein the controller determines the updated configuration of the sign display panel message.

39. The method of claim 31, wherein the at least one display parameter includes at least one of a minimum font size, a maximum font size, a minimum character spacing, and a maximum character spacing.

40. A sign display panel, comprising:
at least one interconnect (IC) unit, the at least one IC unit comprising an IC unit central processing unit (CPU) configured to execute software instructions for determining a configuration of at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units, and an IC unit memory configured to store the software instructions for execution by the IC unit CPU
a controller connected to the at least one IC unit, the controller comprising a controller central processing unit (CPU) and a controller memory for storing software instructions executed by the controller CPU to direct the controller to send a message to the at least one IC unit;
the at least one set of display units connected to the at least one IC unit in a closed serial loop, each display unit of the at least one set of display units comprising a plurality of display elements, a display unit central processing unit (CPU), and a display unit memory for storing display unit software configured for execution by the display unit CPU that directs the display unit CPU to detect an error in the message and send an error message to the controller.

41. The sign display panel of claim 40, wherein the controller software instructions include instructions for determining one display unit of the display units included in the at least one set of display units sent the message.

42. The sign display panel of claim 40, wherein the controller software instructions include instructions that determine which one display unit of the display units included in the at least one set of display units sent the error message based on an integer value associated with the error message.

43. The sign display panel of claim 42, wherein the integer value indicates a location of the one display unit that sent the error message relative to other display units of the at least one set of display units.

44. A method of sign display panel communication, comprising:
connecting at least one set of display units, at least one interconnect (IC) unit, and a controller in a closed serial loop, wherein each display unit of the at least one set of display units includes a plurality of display elements, the at least one IC unit including an IC unit central processing unit (CPU) configured to execute software instructions for determining a configuration of the at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units, and an IC unit memory configured to store the software instructions for execution by the IC unit CPU;
sending a message from the controller to the at least one IC unit;
sending the message from the at least one IC unit to the at least one display unit of the at least one set of display units;
receiving the message at the at least one display unit;
detecting an error in the message; and
sending an error indication from the at least one display unit to the controller based on the detected error in the message.

45. The method of claim 44, further including:
determining which display unit of the at least one set of display units sent the error indication.

46. The method of claim 45, further including:
determining which display unit of the at least one set of display units sent the error indication based on an integer value associated with the error indication.

47. A method of sign display panel communication, the method comprising:
connecting at least one set of display units, an interconnect (IC) unit, and a controller in a closed serial loop, wherein each display unit of the at least one set of display units includes a plurality of display elements, the IC unit including an IC unit central processing unit (CPU) configured to execute software instructions for determining a configuration of the at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units, and an IC unit memory configured to store the software instructions for execution by the IC unit CPU;
setting a timer to a time limit;
receiving communication integrity messages from the controller through the IC unit;
resetting the timer to the time limit upon receipt of each of the communication integrity messages; and
sending an error message to the controller when the timer meets or exceeds the time limit.

48. A method of sign display panel communication, the method comprising:
connecting at least one set of display units, an interconnect (IC) unit, and a controller in a closed serial loop, wherein each display unit of the at least one set of display units includes a plurality of display elements, the IC unit including an IC unit central processing unit (CPU) configured to execute software instructions for determining a configuration of the at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units, and an IC unit memory configured to store the software instructions for execution by the IC unit CPU;
sending communication integrity messages to the at least one set of display units through the IC unit;
receiving a response message from at least one display unit included in the set of display units in response to each of the communication integrity messages; and
determining if the response message indicates a communication error.

49. The method of claim 48, further including:
determining a source of the communication error if the response message indicates the communication error.

50. The method of claim 49, wherein the response message includes an integer value corresponding to a display unit that sent the response message.

51. The method of claim 48, further including:
setting a timer to a time limit in response to sending each communication integrity message; and initiating a diagnostic utility if the timer meets or exceeds the timer limit before the response message is received.

52. A sign display panel controller that is connected to an interconnect (IC) unit and at least one set of display units in a closed serial loop, comprising:
   a controller central processing unit (CPU);
   an I/O interface for sending communication integrity message to at least one of the set of display units through the IC unit; and
      a memory comprising controller software configured for execution by the controller CPU, wherein the controller software comprises software instructions for determining an error based on a response message received in response to each of the communication integrity messages, wherein the response message comprises an integer value and each display unit of the at least one set of display units that receives the response message performs a mathematical process using the integer value,
   wherein the IC unit includes:
      an IC unit central processing unit (CPU) configured to execute software instructions for determining a configuration of at least one set of display units, wherein the IC unit CPU is further configured to execute software instructions for determining an updated configuration of at least a portion of the sign display panel message based on the message, one or more parameters associated with the at least one set of display units, and the configuration of the at least one set of display units; and
      an IC unit memory configured to store the software instructions for execution by the IC unit CPU.

53. The sign display panel controller of claim 52, further including a timer set to a time limit, wherein the controller software further comprises software instructions for resetting the timer to the time limit in response to sending each of the communication integrity messages and initiating a diagnostic utility if no message is received before the timer meets or exceeds the timer limit.

54. The sign display panel controller of claim 52, wherein the instructions for determining an error further include determining a location of the error based on the message.

55. The sign display panel controller of claim 52, wherein the message comprises an integer value associated with the display unit that sent the message, and the software instructions for determining a location of the error further comprise software instructions for determining the display unit that sent the indication based on the integer value.

56. The sign display panel controller of claim 52, wherein the error message includes an integer value reflecting a value greater than a total number of display units in the at least one set of display units and each display unit that receives the message decrements the integer value.

57. The sign display panel controller of claim 52, wherein the error message includes an integer value reflecting a value greater than a total number of display units in the at least one set of display units and each display unit that receives the message increments the integer value.

58. A set of sign display panel components connected in a closed serial loop communication network, wherein each sign display panel component receives messages from a first sign display panel component, and sends messages to a second sign display panel component, the set of sign display panel components comprising:
   a controller comprising a controller central processing unit (CPU) and a memory comprising controller software configured for execution by the controller CPU, wherein the controller software comprises software instructions for sending communication integrity message to the serial communication network;
   at least one interconnect (IC) unit connected to the controller and configured to receive the communication integrity messages, the at least one IC unit including:
      an IC unit central processing unit (CPU) configured to execute software instructions for determining a configuration of at least one set of display units, wherein the IC unit CPU is further configured to execute software instructions for determining an updated configuration of at least a portion of the skin display panel message based on the message, one or more parameters associated with the at least one set of display units, and the configuration of the at least one set of display units; and
      an IC unit memory configured to store the software instructions for execution by the IC unit CPU; and
   wherein each display unit of the at least one set of display units comprises:
      a display timer set to a time limit;
      a display unit central processing unit (CPU); and
      a display memory for storing display unit software configured for execution by the display unit CPU, wherein the display unit software comprises display unit software instructions for resetting the display timer upon receipt of each communication integrity message from the IC unit and, if the timer meets or exceeds the timer limit, sending an error message to the controller, wherein the error message comprises an integer value and each display unit that receives the error message performs a mathematical process on the integer value.

59. The set of sign display panel components of claim 58, wherein the error message includes an integer value and each display unit that receives the error message decrements the integer value.

60. The set of sign display panel components of claim 58, wherein the error message includes an integer value and each display unit that receives the error message increments the integer value.

\* \* \* \* \*